United States Patent
Frisch et al.

(10) Patent No.: US 7,106,742 B1
(45) Date of Patent: Sep. 12, 2006

(54) METHOD AND SYSTEM FOR LINK FABRIC ERROR DETECTION AND MESSAGE FLOW CONTROL

(75) Inventors: Robert C. Frisch, Westford, MA (US); Bryan D. Marietta, Austin, TX (US); Daniel L. Bouvier, Austin, TX (US)

(73) Assignees: Mercury Computer Systems, Inc., Chelmsford, MA (US); Freescale Semiconductor, Inc., Austin, TX (US)

( * ) Notice: Subject to any disclaimer, the term of this patent is extended or adjusted under 35 U.S.C. 154(b) by 570 days.

(21) Appl. No.: 09/758,798

(22) Filed: Jan. 11, 2001

Related U.S. Application Data

(60) Provisional application No. 60/175,856, filed on Jan. 13, 2000.

(51) Int. Cl.
  *H04L 12/28* (2006.01)
  *H04L 12/56* (2006.01)
(52) U.S. Cl. .................. 370/394; 370/236; 370/244
(58) Field of Classification Search ............... 370/394, 370/386, 389, 392, 229, 235, 236, 216, 241, 370/242, 244, 248, 249, 400, 401
  See application file for complete search history.

(56) References Cited

U.S. PATENT DOCUMENTS

| | | | |
|---|---|---|---|
| 5,581,705 A * | 12/1996 | Passint et al. .............. 709/200 |
| 5,592,536 A * | 1/1997 | Parkerson et al. .......... 455/462 |
| 5,598,568 A | 1/1997 | Frisch .......................... 712/29 |
| 6,173,431 B1 * | 1/2001 | Rittle .......................... 714/778 |
| 6,249,530 B1 * | 6/2001 | Blanco et al. ............... 370/468 |
| 6,301,249 B1 * | 10/2001 | Mansfield et al. .......... 370/394 |
| 6,389,016 B1 * | 5/2002 | Sabaa et al. ................. 370/389 |
| 6,452,926 B1 * | 9/2002 | Wiklund ..................... 370/388 |
| 6,545,981 B1 * | 4/2003 | Garcia et al. ............... 370/242 |
| 6,611,521 B1 * | 8/2003 | McKay et al. .............. 370/392 |
| 6,674,735 B1 * | 1/2004 | Saunders et al. ........... 370/331 |

\* cited by examiner

*Primary Examiner*—Brian Nguyen
(74) *Attorney, Agent, or Firm*—David J. Powsner; Nutter McClennen & Fish LLP

(57) ABSTRACT

A digital data system employs multiple error protection mechanisms on messages that pass along a link interconnect fabric from one node or device to another node or device. The nodes may be end points (such as processor or storage units), or may be intermediate devices or branch points (such as routers or switches in the interconnect fabric). The interconnect fabric comprises a set of one or more routers, switches, electrical, optical, electroptical or other links along which messages are passed. Messages are packets having a defined format including, e.g., a header portion, typically with source and target addresses, and codes indicating message-type or other information, followed by one or more data or other fields. A first node ("sending" node) of a digital data system as described sends a data transmission comprising one or more message packets to a second node ("receiving" node) over a link of a fabric as described above. The receiving node returns a control symbol to the sending node for each packet received on the link. The sender uses information in that symbol to control the further transmission of message packets to receiver over the link.

6 Claims, 12 Drawing Sheets

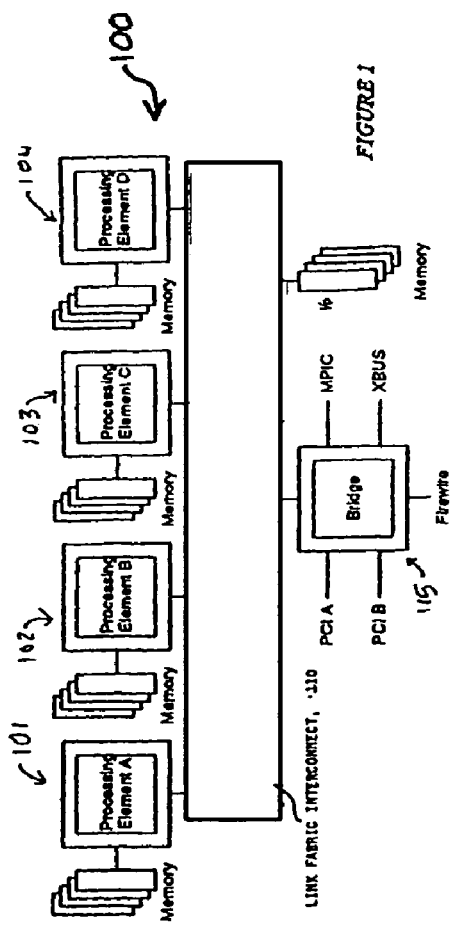
FIGURE 1
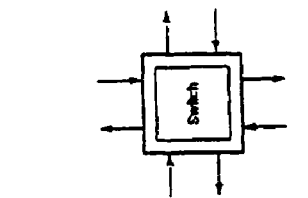
FIGURE 1E
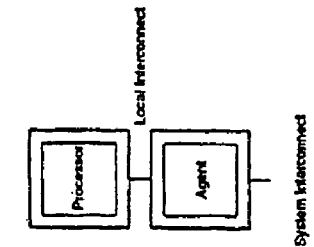
FIGURE 1D
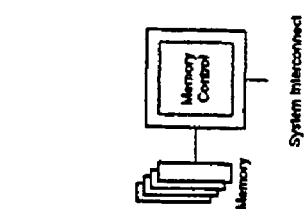
FIGURE 1C
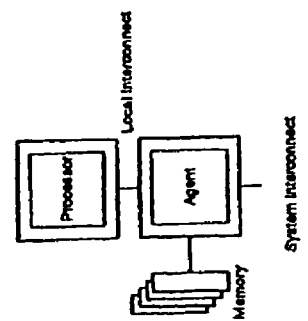
FIGURE 1B
FIGURE 1A

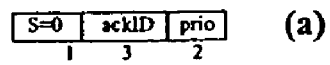
Packet Physical Layer Fields Format
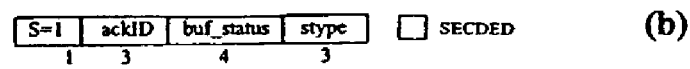
Control Symbol Physical Layer Fields Format
Flow Control Fields Bit Stream
*FIG. 5*
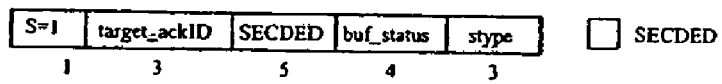
Error Correction Coverage of a Typical Control Symbol
*FIG. 6*

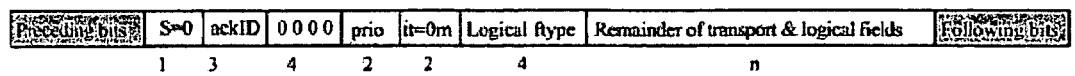
Figure 7. Packet Bit Stream
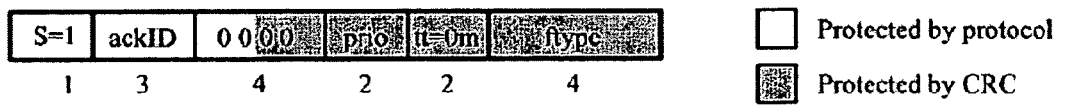
☐ Protected by protocol
▨ Protected by CRC
Figure 8. Error Coverage of First Symbol of Packet Header

Control Symbol Single-bit Error Correction

| First Symbol Condition | Second symbol condition (re-inverted) | Number of bit mismatches between first and second symbol[1] | Result |
|---|---|---|---|
| No error | No error | 0 | Continue |
| Single bit error | No error | 1 | Correct and continue |
| No error | Single bit error | 1 | Continue |

[1] This excludes the 4-bit buf_status field since it is not critical to system operation

*FIGURE 9A*

Table 1-6. Control Symbol Multiple-bit Error Correction

| First Symbol Condition | Second symbol condition (re-inverted) | Number of bit mismatches between first and second symbol[1] | Result |
|---|---|---|---|
| Single bit error | Single bit error | 0 | Correct and continue |
| Single bit error | Single bit error | 2 | Correct and continue |
| No error | Multiple bit error | 2 | Use first symbol and continue |
| Multiple bit error | No error | 2 | Use second symbol and continue |
| Single bit error | Single bit error | 0 | Correct and continue |
| Single bit error | Multiple bit error | 3 | Correct first symbol and continue |
| multiple bit error | Single bit error | 3 | Correct second symbol and continue |

[1] This excludes the 4-bit buf_status field because it is not critical to system operation

*FIGURE 9B*

**Table *A* SECDED Encoding**

| Protection Bit | Data Bit | | | | | |
|---|---|---|---|---|---|---|
| | 0 | 1 | 2 | 3 | 4 | 5 |
| 0 | | x | x | x | x | x |
| 1 | x | x | | x | x | |
| 2 | x | | x | x | | x |
| 3 | x | x | x | | | |
| 4 | | | | | x | x |

**Table *B* Bit Coverage**

| Data bit | Covered symbol bit |
|---|---|
| 0 | ackID[0] |
| 1 | ackID[1] |
| 2 | ackID[2] |
| 3 | stype[0] |
| 4 | stype[1] |
| 5 | stype[2] |

Figure 10

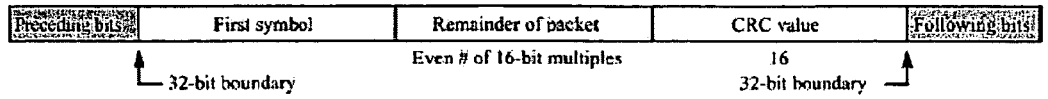
Figure 11A. Naturally Aligned Packet Bit Stream Example 1
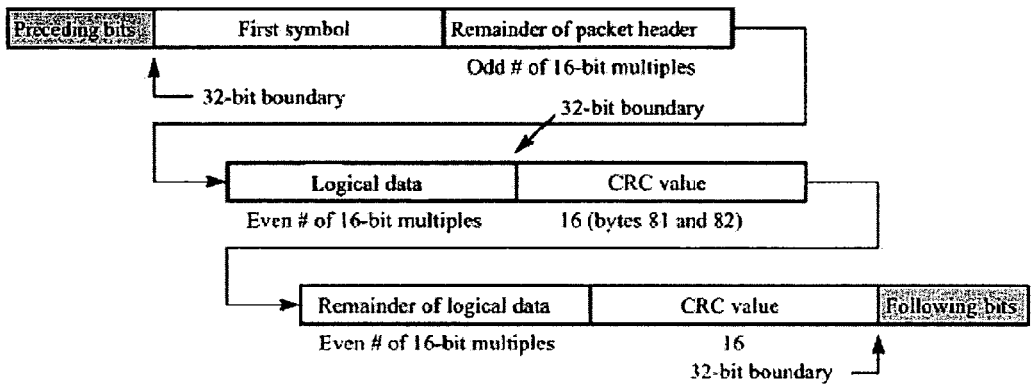
Figure 11B. Naturally Aligned Packet Bit Stream Example 2
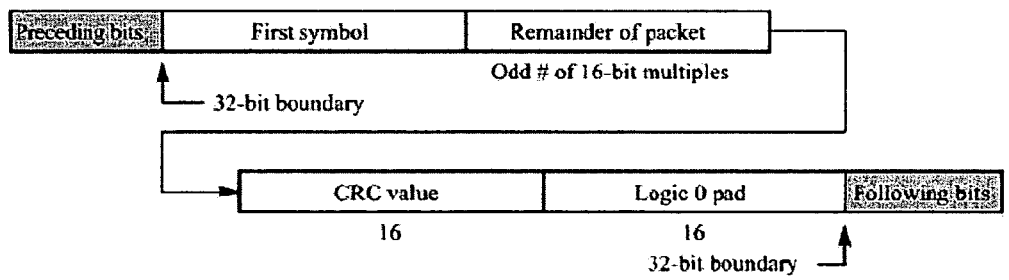
Figure 11C. Padded Aligned Packet Bit Stream Example 1

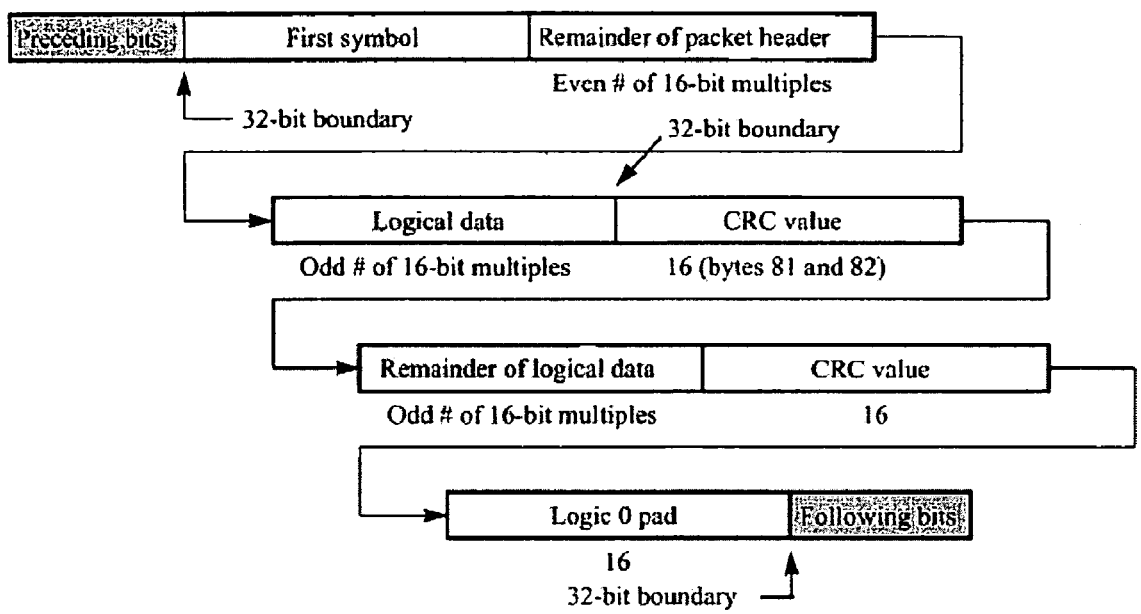
Figure 11D. Padded Aligned Packet Bit Stream Example 2

Parallel CRC Intermediate Value Equations

| Check Bit | e00 | e01 | e02 | e03 | e04 | e05 | e06 | e07 | e08 | e09 | e10 | e11 | e12 | e13 | e14 | e15 |
|---|---|---|---|---|---|---|---|---|---|---|---|---|---|---|---|---|
| C00 |  |  |  | x | x |  |  | x |  |  |  | x |  |  |  |  |
| C01 |  |  |  |  | x | x |  |  | x |  |  |  | x |  |  |  |
| C02 |  |  |  |  |  | x | x |  |  | x |  |  |  | x |  |  |
| C03 | x |  |  |  |  |  | x | x |  |  | x |  |  |  |  | x |
| C04 | x | x |  |  | x | x |  |  | x |  |  |  |  |  |  |  |
| C05 |  | x | x |  |  | x | x |  |  | x |  |  |  |  |  |  |
| C06 | x |  | x | x |  |  | x | x |  |  | x |  |  |  |  |  |
| C07 | x | x |  | x | x |  |  | x | x |  |  |  | x |  |  |  |
| C08 | x | x | x |  | x | x |  |  | x | x |  |  |  | x |  |  |
| C09 |  | x | x | x |  | x | x |  |  | x | x |  |  |  | x |  |
| C10 |  |  | x | x | x |  | x | x |  |  | x | x |  |  |  | x |
| C11 | x |  |  | x |  |  |  | x |  |  |  | x |  |  |  |  |
| C12 | x | x |  |  | x |  |  |  | x |  |  |  | x |  |  |  |
| C13 |  | x | x |  |  | x |  |  |  | x |  |  |  | x |  |  |
| C14 |  |  | x | x |  |  | x |  |  |  | x |  |  |  | x |  |
| C15 |  |  |  | x | x |  |  | x |  |  |  | x |  |  |  | x |

METHOD AND SYSTEM FOR LINK FABRIC ERROR DETECTION AND MESSAGE FLOW CONTROL

REFERENCE TO RELATED APPLICATIONS

This application claims the benefit of priority of U.S. Provisional Patent Application Ser. No. 60/175,856, filed Jan. 13, 2000, entitled "Rio Bus Protocol," the entirety of the teachings of which are incorporated by reference.

BACKGROUND OF THE INVENTION

The current development of computer and embedded systems is burdened by divergent requirements. On one hand performance is expected to increase exponentially, while on the other hand the price of components is driven by market factors to continuously decrease. Developers are burdened with the challenge of increasing device density, or functional density, while decreasing the board space and ultimately the floor space that the components require. The physics of signal handling and transmission, and the need for standardized interconnects and scalable systems, impose further bounds on system development.

Many existing computer systems are built around a single high-speed common bus. When fast digital devices are connected to the bus, they can communicate more quickly, e.g., with higher frequency bus signals. However, as device bandwidth demands increase, each consumes a greater portion of the total bus bandwidth, so that the addition of a small number of high-speed devices quickly offsets overall bus bandwidth gains. Furthermore, interfacing such high bandwidth devices poses additional hardware problems in the physical environment of a typical computer system.

Typically, the connection between microprocessors and peripherals in a computer system has through a hierarchy of shared buses. Devices are placed in an appropriate position in the hierarchy, given their respective levels of performance. Low performance devices are placed on lower performance buses, that are bridged to the higher performance buses, so as to not burden the higher performance devices. Bridging is also used to interface legacy interfaces.

Objectively, the need for higher levels of bus or interconnect performance is driven by two key demands. First is the need for raw data bandwidth to support higher performance peripheral devices. Second is the need for higher degrees of system concurrency. Increasingly, system designers are relying on distributed direct memory access (DMA) and distributed processing to meet these demands.

Over the past several years, the shared multi-drop bus has been exploited to its full potential. Many techniques have been applied to enhance the effective bus bandwidth, such as increasing frequency, widening the interface, transaction pipelining, split transaction, and out of order completion. Continuing to work with a bus in this manner introduces several design issues. Increasing bus width, for example, raises conflicts with physical limitations on the maximum achievable frequency, in part, because of the difficulty of maintaining skew tolerance between signals. More signals also requires more complex hardware, e.g. pins and interface logic, resulting in higher product costs and fewer supported interfaces per device.

Another way to circumvent the bandwidth limitations of a multi-computer system having a common bus is through distributed communications. In this approach, the components of a system are interconnected by multiple local buses. Both the nature and number of local buses can be varied to match the communications needs of a particular system.

Yet another approach is a fabric-based interconnect system. Here, buses are not used as communications paths in the traditional sense. Rather, information is routed between end nodes via fabric of communications links and other nodes. Information traffic in fabric-based systems typically consists of messages having a distinct format and following a protocol. The message format may include routing or other information, in addition to data or "payload," such that each packet can be routed at high speed along the links to its destination. As applied to DMA systems, protocols must permit messages to be driven by the source (which requires access not only to a target, but also visibility into the target's address space), whereas other messages for other transactions or operations are typically steered by the destination.

In order to properly manage the transmission of message packets between hops of a fabric-based system, it is necessary to exchange control signals in a form of "handshake" signaling. Some prior art systems utilize additional, side band signal pins to support the handshake. Other systems have protocols requiring the explicit exchange of control message packets between nodes.

Fabric-based systems offer a number of distinct advantages, since the interconnect fabric may be set up or dynamically reconfigured to route data along available lines, and to provide alternate pathways between endpoints, so that messages, control operations and data may be routed on many paths without collision. Thus the distributed routing of a fabric interconnect message-passing system is advantageously applied to applications, such as distributed direct memory access (DMA) or distributed processing, to further enhance the efficiencies of those approaches.

However, a message-passing system requires adherence to strict protocols for its operation, and is still subject to bandwidth limitations and varying traffic along its constituent links. Moreover, the passing of messages along different links raises many potential failure points, where message corruption or deadlock may occur. Further, the prior art use of side band signal pins to support handshake signaling comes at a cost: more pins, more logic and more board "real estate." The alternative use of explicit control message packets for this purpose can prove expensive from a bandwidth and latency point of view.

An object of this invention is to provide improved digital data systems and methods of operation thereof.

A further object is to provide such systems and methods as provide improved control of traffic in a message-passing digital data system.

A related object is to provide such systems and methods as permit improved traffic control without requiring additional signaling pins and without undue consumption of bandwidth or increases in latency.

SUMMARY OF THE INVENTION

The present invention has application, by way of example, in digital data systems in which messages pass along a link interconnect fabric from one node or device to another node or device. The nodes may be end points (such as processor or storage units), or may be intermediate devices or branch points (such as routers or switches in the interconnect fabric). Messages are packets having a defined format including, e.g., a header portion, typically with source and target addresses, and codes indicating message-type or other information, followed by one or more data or other fields.

In accordance with one aspect of the invention, a first node ("sending" node) of such a digital data system sends a data transmission comprising one or more message packets to a second node ("receiving" node) over a link of an interconnect fabric. The receiving node returns a control symbol to the sending node for each packet received on the link. The sender uses information in that symbol to control the further transmission of message packets to receiver over the link.

A system according to the invention ensures message efficiency and integrity on individual links of the fabric. Transmission errors occurring while the packets are transmitted over a plurality of links, e.g., from one end node to another, are corrected essentially when and where they occur. As a result, the endpoint devices are not tied up awaiting completion of a transaction or multi-packet transfer before they can detect errors or initiate recovery.

In accordance with further aspect of the invention, the second node of a digital data system as described above is connected to a further node (a third node, e.g., another endpoint) via a further link of the interconnect fabric. For each packet received from the first node, the second node returns a control symbol, e.g., acknowledging proper packet reception or indicating an error, for example, in the content or sequence of the received packet, before or while passing that packet onto the further node.

The first node of a digital data system as described above can respond to a control symbol indicating proper packet reception, for example, by clearing its buffers of the packet(s) previously transmitted, validly received and acknowledged. Conversely, it can respond to a symbol indicating an error by retransmitting corrupted or lost packets.

Further aspects of the invention provide a digital data system as described above in which the control symbol includes status information indicating the availability of ports, processing resources or packet buffers in the second node. Such information can be used by the first node to regulate its transmission rate efficiently to the available receiving resources without deadlock.

In accordance with a further aspect of the invention, control symbols used to acknowledge received packets may be specially-delineated to optimize flow or integrity at the link level, i.e., between adjacent nodes and/or elements in the interconnect fabric. These acknowledgement control symbols may be transmitted as the packets are being received, without corrupting the packets. As noted elsewhere herein, the symbols may carry information effective to regulate message flow, identify faulty message data, and otherwise enhance the speed, accuracy or efficiency of communications over the link.

According to other aspects of the invention, the first and second nodes in a digital data system as described above include state machines that operate in accordance with commands or data contained in the control symbol to coordinate the handling of transmitted and received packets to assure packet integrity without unduly burdening message buffers.

The nodes in systems described above, moreover, can employ a variety of mechanisms to detect different types of errors. For example, a message packet transmitted by a sending node may comprise a header portion and a data portion, with at least the data portion including an error code. The receiving node uses that error code to at least detect, if not correct, errors in data or overall packet content.

In a related aspect, the sending node includes an "early" error code with the header portion of the packet. The receiving node can inspect that portion of an incoming packet to detect an error condition, returning a control symbol over the link even before the full packet has arrived. Both the receiver and sender may discard post-error data so that both nodes back up to the last valid data and are immediately free to continue.

Still further aspects of the invention provide a digital data system as described above, wherein a part of the header of a message packet changes as the packet passes through the fabric and wherein other parts of the header (as well as the entirety of the data portion) may be invariant. The changeable part may include a sequence identifier, which each receiving node compares against an expected value to detect errors in transmission ordering. An error detection mechanism employed for the changeable part includes logic comparisons with internal format or external protocol attributes. An additional error code included in the packet and applicable to the invariant parts is checked as the message packet passes each node.

These and other aspects of the invention are evident in the drawings and the description that follows.

BRIEF DESCRIPTION OF THE DRAWINGS

Features and advantages of the invention and its structure and operation will be understood from the description and illustrative drawings herein, wherein:

FIG. 1 illustrates a digital data system having a message passing system in accordance with the present invention;

FIGS. 1A–1E illustrate various devices that may be connected as nodes or endpoints in the system of FIG. 1;

FIG. 5 illustrates format of physical layer field for regulating flow of a packet transmission on a link in a system according to the invention;

FIG. 6 illustrates error protection of fields in a control symbol for regulating flow of data on a link in a system according to the invention;

FIG. 7 illustrates the physical layer fields added to a packet;

FIG. 8 illustrates error coverage of initial field of a packet header;

FIGS. 9A and 9B illustrate control symbol error correction;

FIG. 10 illustrates SECDED error protection of fields;

FIG. 11A illustrates one example of a naturally 32-bit aligned packet of less than or equal to 80 bytes;

FIG. 11B illustrates an example of a naturally 32-bit aligned packet of greater than 80 bytes;

FIG. 11C illustrates an example of a padded 32-bit aligned packet of less than or equal to 80 bytes;

FIG. 11D illustrates an example of a padded 32-bit aligned packet of greater than 80 bytes; and FIGS. 12, 12A illustrate CRC computation.

DETAILED DESCRIPTION OF ILLUSTRATIVE EMBODIMENTS

Figure 2:
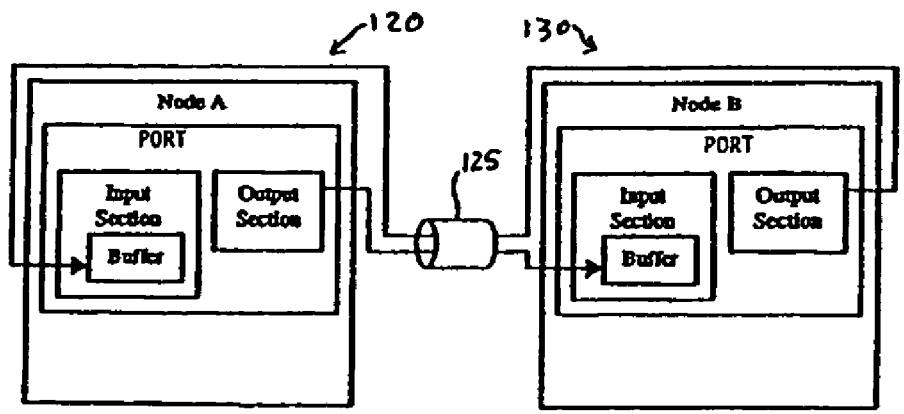
FIG. 2 illustrates two nodes connected by a link in a system of the invention.

Architecture and Interconnect Fabric FIG. 1 illustrates generally an embodiment of a digital data system 100 employing link interconnect message communication in accordance with the present invention. The system includes a plurality of nodes, some of which are shown as digital devices 101, 102, 103, 104, . . . . In the illustrated embodiment, these are processors with associated memories, though, they may also comprise other digital devices capable of generating, handling and/or passing message packets.

In this regard, it will be understood that messaging over interconnected links as described herein has wide application, e.g., to systems that implement direct memory access, to systems that provide communications between processors in a domain, as well as to systems that provide such communications between lower-level digital devices or components. Examples of the former are provided by FIGS. 1 and 1A. Examples of the latter are provided by FIGS. 1B and 1D (a stand-alone processor or processor/agent with no storage or I/O capability—other than its interface to the link fabric); 1C (a stand-alone memory with no processor—other than a controller that interfaces to the link fabric); and 1E (a switch processing element that receives multiple inputs along links in the interconnect fabric and generates corresponding output). Other devices or components in which such messaging has application include a bridge 115, as shown in FIG. 1, or an I/O device that operates to move data into or out of local or remote memory or that interfaces static storage or other devices or systems.

The illustrated devices 101, 102, 103, 104, . . . , are interconnected and communicate by a link fabric 110, which passes messages using buses, routers, switches, electrical, optical, electro-optical or other message-carrying elements. The routers and switches, by way of example, are vertices of the fabric. It will be appreciated that nodes 101, 102, 103, 104, . . . , may form vertices of the fabric as well. Conversely, it will be appreciated that the routers, switches, and certain other message-carrying elements (i.e., those capable of generating and/or handling message packets) may be nodes. Regardless of whether nodes or other vertices, these devices may be embodied on a single piece of silicon, on a single board, in a single unit, or distributed among several interconnected boards and/or units.

In general, communications are effected in the illustrated system by messages which pass between desired endpoints in the system along links, each link extending between one vertex and another vertex. To this end, the nodes and/or other vertices may be associated with addresses. Thus, for example, illustrated digital devices 101, 102, 103, 104, . . . , each have an address or identifier by which they may be referred in message packets sent on the fabric. Messages are packets having a defined format including, e.g., a header portion with source and target addresses, and message-type or other codes, followed by one or more data or other fields, one example of which is described below in connection with FIG. 3. The format of a message packet may differ for different types of communications or transactions, but is predetermined for each type of message.

In some embodiments of the invention nodes and vertices of the link interconnect fabric 110 may be constructed and operated in the manner of the crossbar switches described in U.S. Pat. No. 5,598,568, as modified in accord with the teachings herein. The teachings of the aforementioned patent are incorporated herein by reference in their entirety.

In general, the architecture of a link fabric messaging system is intended to pass messages of defined formats and relatively small size at the link, or physical, level, using a defined protocol that allows the nodes at the ends of a link to dependably effect their message reception, handling and transmission at high speeds. The link-level message reception, handling and transmission may be effected with registers and timing or control elements, which may be implemented on a single piece of silicon or, otherwise, with a relatively small amount of logic. Such message handling circuitry may be fabricated integrally with a node or other vertex of the fabric (e.g., on a chip or board level), or it may be separate or free-standing device.

FIG. 2 illustrates a link 125 interconnecting two nodes 120, 130 in a system of the present invention. The illustrated nodes are, by way of example, an endpoint (such as workstation 101) and a branch point (such as router or switch). The latter typically transfers messages received on the link from node 120 further along the link interconnect fabric, and vice versa.

Each of illustrated nodes 120, 130 operates under a set of instructions such that, e.g., messages received at an input port of the node may be placed in an input section buffer, and messages or data for forming messages are passed for transmission via an output port.

The nodes may have plural input ports, or plural receiving buffers in the receiving section, for receiving messages from different links, or for receiving and ordering multiple packets constituting one or more than one different messages. The buffers may be configured so as to temporarily store received packets while message integrity and completeness are confirmed or corrected, or any necessary address, control or path configuration data are processed. Similarly, multiple output buffers and/or ports may be provided to buffer or handle data which is being transmitted (e.g., in order to match the node's I/O processing rates), to buffer data which has been transmitted (while awaiting confirmation of reception), or to otherwise hold data during a necessary message processing sequence.

Further details of one suitable embodiment of the nodes as described herein for carrying out such message communications may be found in the two United States patent applications entitled BUS PROTOCOL INDEPENDENT METHOD AND STRUCTURE FOR MANAGING TRANSACTION PRIORITY, ORDERING AND DEADLOCKS IN A MULTI-PROCESSING SYSTEM, and entitled METHOD AND APPARATUS FOR MAINTAINING PACKET ORDERING WITH ERROR RECOVERY AMONG MULTIPLE OUTSTANDING PACKETS BETWEEN TWO DEVICES, being filed of even date herewith and bearing Ser. Nos. 09/758,855 and 09/758,864, respectively. Further details regarding the use of control symbols, or short link level commands or control communications transmitted between nodes on a link may be found in the United States patent application entitled DIGITAL DATA SYSTEM WITH LINK LEVEL MESSAGE FLOW CONTROL, also being filed of even date herewith and bearing Ser. No. 09/758,949. Each of those patent applications is hereby incorporated herein by reference in its entirety.

Briefly, in a link fabric interconnect, processing elements such as switches provide the interconnect fabric between end points; a single link (e.g., a bus or other electrical, optical, electro-optical, or other signal carrying element) connects to a node at each end. The nodes utilize that link to transfer, not only message packets, but also requests and responses for link-level information among each other. The link-level information can include information such as an indication of buffer status, an ACKNOWLEDGMENT of message receipt, or other information useful at the link level to assure efficient message flow and message integrity. The nodes follow defined protocols to supply or request such information or necessary parameters, and to acknowledge receipt of, or to request retransmission of messages in progress, such that the messaging traffic proceeds smoothly. Thus, flow control and error handling are managed between each electrically connected device pair rather than between the original source and final target of the transaction.

The links may be full duplex, and the nodes configured to send and receive message packets. Illustratively herein each packet is composed of a number of 32-bit words (symbols), and includes an error code such as a CRC code. The words of a packet are sent over the link, and a node receiving the symbols at the other end of the link checks the error code, and if the code indicates an error occurred in transmission, the receiving node sends a request on the link for retransmission. If the error code indicates the message is correct, the receiving node sends an ACKNOWLEDGMENT that it properly received the message. Once the receiving node has acknowledged successful message reception, the sending node may clear its buffers of the transmitted message. Thus, the nodes at each end of a link are configured to assure that messages are faithfully passed over the link, yet may operate with relatively small buffer capacity to check, confirm and pass along messages in order. Operation of the nodes to efficiently detect corrupt packets and carry out retransmission between such interconnected nodes is described in detail in the aforesaid patent application entitled METHOD AND APPARATUS FOR MAINTAINING PACKET ORDERING WITH ERROR RECOVERY AMONG MULTIPLE OUTSTANDING PACKETS BETWEEN TWO DEVICES, Ser. No. 09/758,864.

The link-level information, that is the control information (distinct from the message packet information) passing between two adjacent nodes, may be encoded in relatively short blocks. In accordance with one illustrative embodiment, each of these control instructions is encoded in a single word, i.e. a "control symbol". A control symbol may be sent by a node that is transmitting a message to a receiving node. A control symbol may also be sent by a node that is receiving a message to the node that is transmitting that message. Control symbols may also be sent over the node when no messages are being sent. Two nodes connected to the link (e.g., two switch nodes, or a switch and an endpoint node) may use the control symbols to exchange link-level information for controlling various link-level mechanisms. Preferably the system is implemented such that a link-level control symbol never travels over more than one link. In one typical situation, a control symbol may be transferred during the period between two message packets. It may also be sent during or within a message packet transmission as described in the above-reference patent application entitled DIGITAL DATA SYSTEM WITH LINK LEVEL MESSAGE FLOW CONTROL, Ser. No. 09/758,949. These symbols are referred to herein as embedded control symbols.

Operation of the error detection and correction mechanisms of the present invention will be understood in the context of a link fabric messaging system described below. Such a system may advantageously be effected such that a message packet sent by one node on a link to a receiving node at the other end of the link is comprised of a sequence of symbols (e.g., 32-bit words) that are transmitted in order over the link. A frame signal may be asserted at the start of the packet to mark the first symbol of the packet (e.g.; the first 32-bit word), and the messages formatted, and handled within each node, such that the subsequent symbols of a packet are aligned with word boundaries established by the frame signal.

By way of physical example, a link communication chip node may employ an input or output port that is eight or sixteen bits wide in order to accept or transmit four-byte words. Alignment of the transmitted symbols on word boundaries allows the node, e.g., the chip, to operate internally with a slow (e.g., divided-down) clock, and provides a dependable mechanism for alignment and processing of formatted symbols and messages exchanged through the ports between nodes on the link. When so aligned, particular bit positions of defined fields are detected and processed to determine message types, administrative or status information or commands for node operation, and transmission errors. Suitable methods of transmitting and aligning data are described below with reference to FIG. 4.

In a link fabric messaging system of this type, a message packet may defined for each of various transactions or communications between devices. Thus, for example, the system may utilize messages of one format for direct writes to memory; messages of another format for querying a remote device for status; messages of still another format for device configuration or other data; and so forth. Each message typically has a header and may have a data or other subsequent portion. The header can indicate message origin, destination, message type, size of data portion or other subsequent portion. The header may also include one or more error detection or correction codes, a priority code to govern message handling, and/or information that the receiving node may use for configuration or routing.

In general, a message received by a node may be placed in an input buffer, appropriate bit positions inspected for necessary information, particular bits or fields may be modified, and may be passed for transmission along another, or back along the same link, as appropriate to the message type. A node may take an unspecified period of time between receiving a packet and transmitting it to the next node to allow for in-transit housekeeping, such as error checking and correction, coordination when words are received out of order in a multi-word message packet, setting up of further buffers, sending of an acknowledgment or a request for retransmission, and other such operations. Aspects of the invention provide systems as described above that utilize the aforementioned control symbols to coordinate intra-link communication between sending and receiving nodes during these operations, and to detect and/or correct errors in transmission on the link.

In one embodiment of a message-passing link interconnection of the present invention, the links transfer packets in order, and each packet has a field ackID indicating this order. A brief discussion of ordering or correction mechanisms related to this field and operating at the link level to enhance message flow are included here, and are more fully described in the aforesaid METHOD AND APPARATUS FOR MAINTAINING PACKET ORDERING patent application. The ackID field may be reassigned, and thus may be different, each time the message passes on a different link, so a special error code covering only the initial bits of the symbol may be used to check header symbol integrity without having to compute an error code for the entire massage or packet. Alternatively, these bits may be checked by simple logic and excluded from the portion to which a packet error code is applied.

The output section of each node may, for example, maintain a three bit counter, and set the ackID of each outgoing packet, starting at ackID 000 for the first packet after reset. The counter is incremented each time a packet is sent, and the counter rolls over after 111. Each input section may then maintain an input counter that indicates the next expected packet number, and checks that each received packet has the correct sequence number. If no errors are detected and the ackID is the expected number, the receiving node may sends a control symbol (denoted the PACKET_ACCEPTED ACKNOWLEDGE control symbol) over the link to the adjacent (sending) node acknowledging proper reception. Otherwise the receiving node sends a symbol (denoted the PACKET_NOT_ACCEPTED control symbol) to the adjacent node causing it to initiate a retry mechanism. Both of these acknowledge control symbols include the ackID of the received packet. This flow control mechanism assures that transmitted messages are faithfully received, corrected if needed, and passed along the link fabric, thus allowing a transmitting node to quickly clear its buffers of message transactions, so that a receiving node quickly receives and passes along complete packets, while avoiding the corruption of packets in transit.

The implementation of error management by communicating control symbols between adjacent nodes will be best understood in the context of a specific messaging format and protocol, which will be discussed below to illustrate representative implementations of the control and coordination of messaging on a link.

By way of overview, messaging is effected as follows. Each direction of a link is composed of data signals, a frame signal, and a clock. Various physical implementations are possible. The frame signal helps delineate message packets, e.g., so they may be aligned and processed in a receiving node. The frame signal is asserted at the beginning of a message packet. The frame signal may also be asserted at the beginning of a control symbol. All packets and control symbols, whether sent over 8-bit or 16-bit ports, are aligned to 32-bit word boundaries. Packets that are not naturally aligned to a 32-bit boundary are padded. Control symbols may be nominally 16-bit quantities, but are preferably defined as a 16-bit control symbol followed by a bit-wise inverted copy of itself, so that it aligns to the 32-bit boundary. The presence of a bit-wise inverted copy may be applied as an error detection mechanism to the interface. These 32-bit quantities will be referred to as aligned control symbols.

A single bit position, termed the "S" bit, may be used as a flag to encode whether the symbol is a control symbol (S=1) or a message packet header (S=0). The receiving node passes an incoming message in proper alignment through registers or logic and inspects its S bit values to determine whether it is a message packet or control symbol, and to effect its handling. The protocol for sending message packets on a link includes acknowledging each received packet. A link requires an identifier to uniquely identify an acknowledgment. This identifier, known as the acknowledge ID (or ackID), is a three bit field in the packet header, allowing for a range of one to eight outstanding unacknowledged request or response packets between connected nodes. The ackIDs are assigned sequentially to indicate the order of the packet transmission. The acknowledgments themselves are each one of a number of different aligned control symbols, discussed separately below, and operate to regulate flow of messages efficiently, and to implement retransmission of packets that were not received or were found to have errors, to ensure that valid packets are received in order and the sending node may clear its packet transmission buffers.

Message Packet Format

Figure 3:
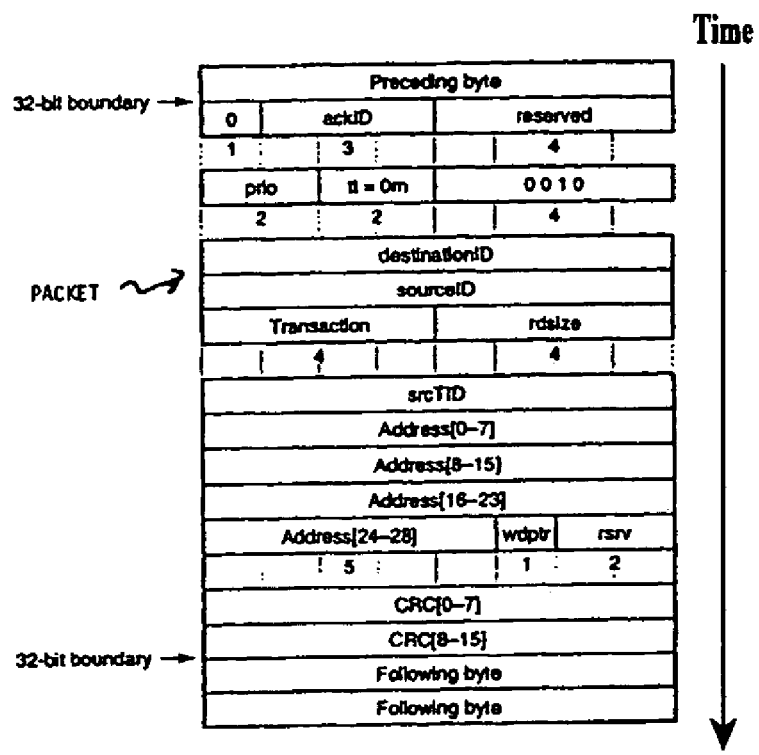
FIG. 3 illustrates representative formats for a message packet on the link of FIG. 2.

FIG. 3 illustrates representative forms of a message packet useful in one embodiment of a message-passing link of the invention such as link 125 of FIG. 2.

The word or the basic unit (not necessarily a control symbol, discussed elsewhere herein) is a four-byte word. In various physical implementations, the bytes may, for example, enter each node via a port eight bits wide, sixteen bits wide, or otherwise. A packet is composed of a number of such words, e.g., a sequence or ordered set of words, for example four, five eight or more words. It will be understood that higher level messages such as data transfers may be transmitted as message packets having a greater number of words, may be transmitted as a plurality of packets, or both. The templates are illustrative only, and particular packet types may be configured differently for different types of messages, such as transaction messages, streaming data messages, requests, responses, or other types of messages. Furthermore, link interconnect systems of the present invention may employ a basic message structure utilizing larger (or smaller) words to form the messages. Thus, while the illustrated templates are shown with a basic four byte symbol, other systems may employ sixteen-bit, thirty-two bit or sixty-four bit interfaces, and may utilize formatted basic units-packet templates and symbols, with halfwords or doublewords of correspondingly different size.

In this example, a four-byte word or symbol is the basic unit for messaging on a link. Each type of message packet has a defined format, with a header comprising a specific set of fields, and these are passed along links to an endpoint. A single-word control symbol is used for communications between nodes on a link, and these are both short and highly formatted. The control symbols, passing between two adjacent nodes at the ends of a single link, do not require addresses, and a small number of bits suffice to encode the link-level control actions (discussed further below) indicated by the control symbol. In other cases, where a symbol starts or continues the header or is subsequent portion of a message packet, the form may differ, and may include specific fields for a header, or simply data in the case of words constituting the data portion of a message packet.

Packet Start and Symbol Delineation, Packet Termination

In the illustrated embodiment, the input and output port of each node is either one or two bytes wide. Like protocols are used for both the 8- and 16-bit wide versions, the only difference being the number of pins used to transmit the packets and aligned control symbols.

Figure 4:
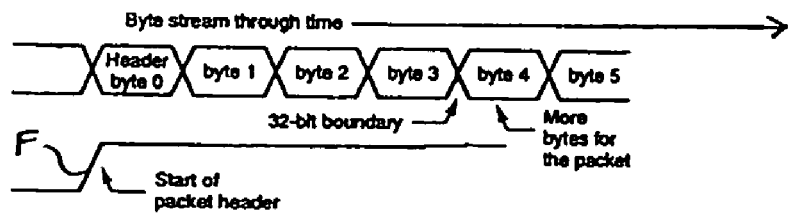
FIGS. 4–4A illustrate embedding of a control symbol in a message packet.

At the outset, it will be appreciated that alignment of message or control symbol words in an illustrative physical implementation of a link may be effected as shown in FIG. 4. In a message packet, the first (header) symbol of a packet is asserted with a frame signal F (e.g., a line high, or line to zero signal). A node, such as node 130 in FIG. 2, receiving a symbol when the frame signal is asserted, aligns the symbol and processes (e.g., with logic) defined bit positions in the first symbol to detect bits encoding information such as specifying a packet type, priority level, source and destination address, and checking or other parameters that determine packet handling. Following the first symbol, the successive symbols of a packet header if any are aligned on the 32 bit word boundaries, and have defined fields that may vary for each type of message packet. Such fields may specify remote device storage addresses to be read or be written to, information about the type of transaction, block size parameters or other such information. Packets that carry data may have data fields.

Figure 4A:
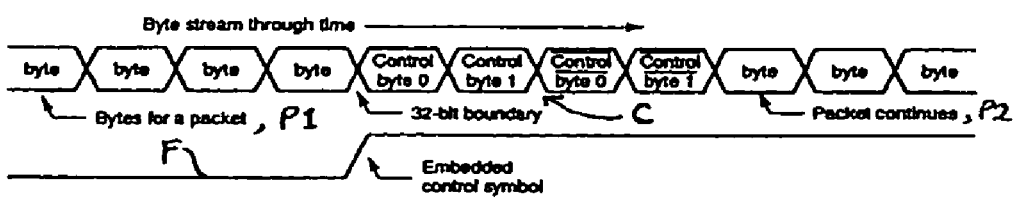

By way of digression, FIG. 4A illustrates such embedding of a control symbol C in an ongoing message packet transmission. As shown, the bytes of the symbol C are inserted at a 32-bit symbol boundary of a stream of bytes constituting the initial symbols P1 of a packet. The frame signal F toggles at the start of the control symbol C. The remaining symbols P2 of the message then follow immediately after the four-byte control symbol, without additional frame or other indication. The receiving node is configured to process the control symbol C separately, while placing P1 and P2 in aligned order so that they are checked or handled and passed along the link fabric as a complete and properly-formatted and ordered message packet.

The frame signal F used to delineate the start of a packet or a control symbol on the physical port is a no-return-to-zero, or NRZ, signal. This frame signal is toggled for the first symbol of each packet and for the first symbol of each aligned control symbol. Therefore, if a 16-bit symbol contains a logical packet format type or a control symbol field, the frame signal must toggle. In order for the receiving processing element to sample the data and frame signals, a data reference signal is supplied that toggles on all possible transitions of the interface pins. This type of data reference signal is also known as a double-data-rate clock. These received clocks on devices with multiple ports have no required frequency or phase relationship. The data reference signal is always rising on the 32-bit boundary when it is legal for the frame signal to toggle as shown in 4B–4E.

Figure 4B:
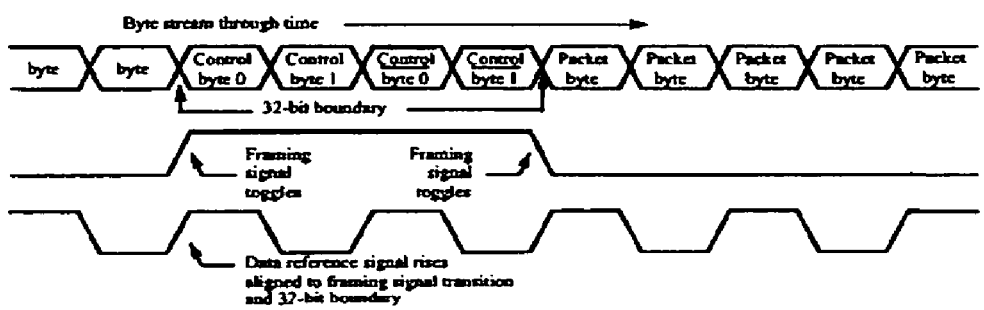
FIGS. 4B–4G illustrate the timing of framing signals that delineate the start of message packets and illustrate packet termination.
Figure 4C:
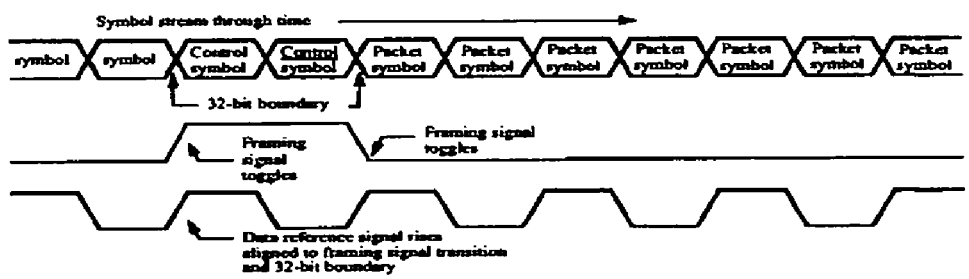
Figure 4D:
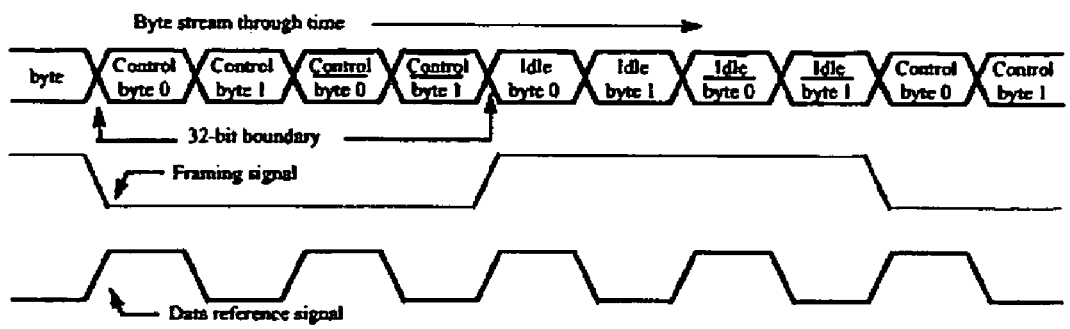
Figure 4E:
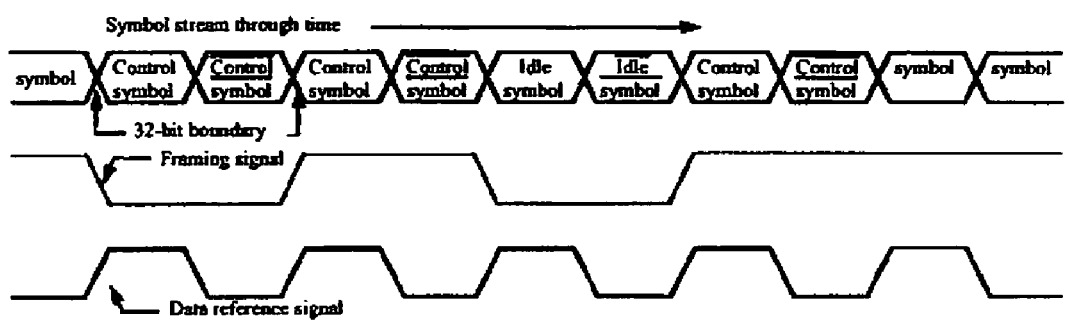

The frame signal F is not toggled for other symbols such as remaining packet header and data bytes. However, it is toggled for all idle symbols between packets. This means that the maximum toggle rate of the control framing signal is every 4 bytes, and that the framing signal is only allowed to toggle on every fourth byte, meaning the framing signal is aligned to a 32-bit boundary as are all of the packets and aligned control symbols. Additionally, the data reference signal must transition from low to high on this same boundary. Examples of these constraints are shown in FIG. 4B and FIG. 4D for an 8-bit port and FIG. 4C and FIG. 4E for a 16-bit port.

Errors on the framing and data reference signals can be detected either directly by verifying that the signals transition only when they are allowed and expected to transition, or indirectly by depending upon detection of packet header or CRC or control symbol corruption if these signals behave improperly. Either method of error detection on the framing and data reference signals allows error recovery by following the mechanisms described below.

A packet is terminated in one of two ways: the beginning of a new packet signals the end of a previous packet; or the end of a packet may be marked with one of the following 16-bit symbols: an aligned end-of-packet (eop), restart-from-retry, link-request, or stomp control symbol. A stomp symbol (as described in aforesaid United States patent application entitled DIGITAL DATA SYSTEM WITH LINK LEVEL MESSAGE FLOW CONTROL, being filed of even date herewith and bearing Ser. No. 09/758,949) is used if a transmitting processing element detects a problem with the transmission of a packet. A device may choose to abort the packet by sending the stomp symbol instead of aborting it in a different, possibly system fatal, fashion-like corrupting the CRC value. The use of such control symbols passed between adjacent nodes allows faulty or partial transmissions to be quickly caught, e.g., stopped from further propagation and discarded from message-handling buffers in affected nodes The restart-from-retry can abort the current packet as well as be transmitted on an idle link. This symbol is used to enable the receiver to start accepting packets after the receiver has retried a packet.

The link-request symbol can abort the current packet as well as be transmitted on an idle link and has several applications. It can be used by software for system observation and maintenance, and it can be used by software or hardware to enable the receiver to start accepting packets after the receiver has refused a packet due to a transmission error.

Figure 4F:
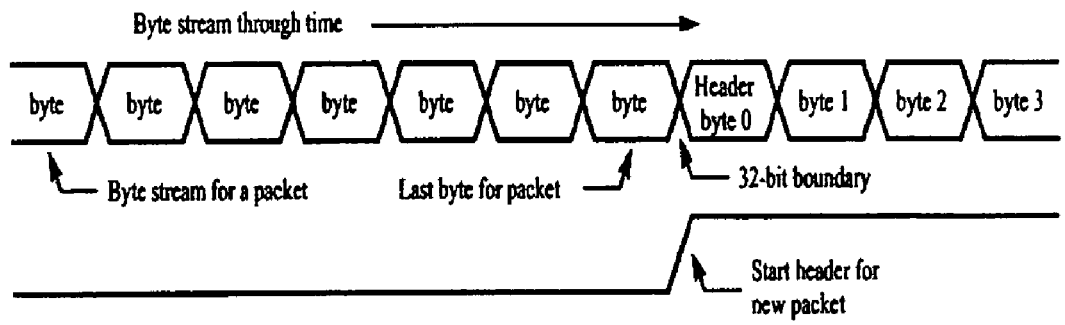
Figure 4G:
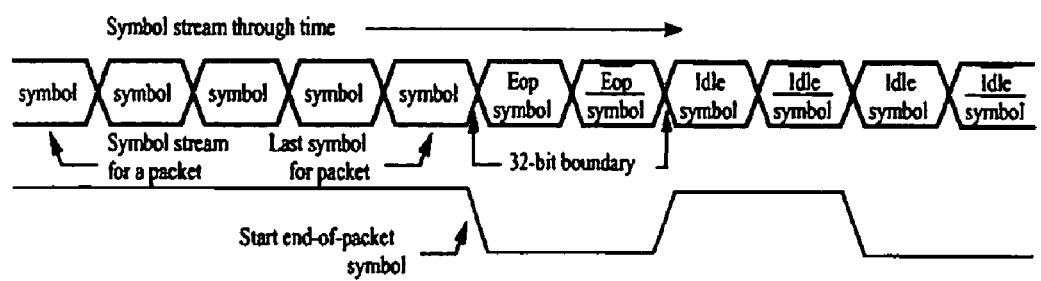

A receiver must drop a stomped packet without generating any errors and must then respond with a retry acknowledgment symbol unless an acknowledgment has already been sent for that packet or the receiver is stopped due to an earlier retry or error. If the receiver is not already stopped it does not stop due to the stomp. FIG. 4F is an example of a new packet marking the end of a packet. FIG. 4G is an example of an aligned end-of-packet symbol marking the end of a packet. The stomp, link-request, and restart-from-retry cases look similar.

Error Management

In accordance with a principal aspect of the present invention, error mechanisms detect corrupted or congested data at the individual physical links of the system, and operate to correct and control message flow. For this purpose certain initial fields in the packet header and in the control symbols are used. These are physical layer fields—i.e., fields that are detected and processed, e.g., by logic or circuitry, at each node for effecting the physical message handling and control at the node. These include the single bit S flag, that indicates to the link level data handling unit whether the word is a control symbol (S=1) or a request or response message packet header (S=0). Other physical layer fields include the 3-bit request or response packet identifier ackID that is used to identify a packet when communicating an acknowledgment back to the sender of the packet, and a 2-bit priority code prio that is used to determine message handling priority (as described in the aforesaid United States patent application entitled BUS PROTOCOL INDEPENDENT METHOD AND STRUCTURE FOR MANAGING TRANSACTION PRIORITY, ORDERING AND DEADLOCKS IN A MULTI-PROCESSING SYSTEM, Ser. No. 09/758,855).

A control symbol includes a short e.g. 3-bit field (denoted stype below) encoding the command, query or link data that is specified by the control symbol. In different embodiments and implementations, the control symbols or packet headers may include other fields, examples of which are discussed as they arise, below. It will further be understood that a given field may encode different information depending on its context, e.g., in a flow control symbol certain field bits may specify receiver buffer status, whereas the same bit positions in a different control symbol may identify a cause of a detected error. The handling of a received message may be governed by a state machine at the input port of a node, that inspects bit positions and undertakes processing steps governed by to carry out the functions described herein.

These steps include acknowledgment messages, communicated by short control symbols that, in turn, cause the upstream node receiving the symbol to undertake appropriate action for the reported reception, or mis-reception indicated by the control symbol. Because receipt of an acknowledgment control symbol does not imply the end of a packet, these symbols can be sent as embedded control symbols within a packet. They may also be sent when the link interconnect between the two nodes is otherwise idle.

Appendix A attached hereto illustrates details of the message handling and communication steps undertaken by the sending and the receiving nodes in response to various error conditions. The link level mechanisms of in transit packet evaluation and correction of corrupted transmissions or recoverable errors will be better understood from a discussion of the format and content of the message packet headers, and the fields employed in the acknowledgment control symbols and the corresponding operations induced at a node sending or receiving such a control symbol as discussed below.

In accordance with a first aspect of this feature of the invention, a node receiving a message packet may send a PACKET_ACCEPTED ACKNOWLEDGMENT control symbol to the upstream node to indicate that the receiving node has properly received the entire packet and has taken responsibility for sending the packet along to its final destination. This symbol may be generated at any time after the entire packet has been received, and has been found (e.g., by applying a packet CRC or other error checking code, or by applying parsing rules) to be free of transmission errors. The upstream or connected node that originally sent the packet may then, upon receiving the PACKET_ACCEPTED ACKNOWLEDGMENT, reallocate its resources, for example, by releasing the packet assembly and transmission buffers that had been allocated to the subject packet.

Systems of the present invention employ message packets having headers and control symbols having formats wherein an initial portion of the header or the control symbol format includes physical layer fields, i.e., fields that are recognized e.g., by logic or simple circuitry in each node, for affecting the physical message handling and control at the node. Thus, for example a message packet header format may include the S flag, the 3 bit ackID field and a 2 bit priority field. Use of a priority code for assuring message flow is discussed in great detail in the aforesaid BUS PROTOCOL INDEPENDENT METHOD patent application. Control symbols, short formatted command or control type words passed between adjacent nodes, may include the S flag, ackID, a buffer status field to specify the number of available buffers in the connecting node, and a symbol type indicator identifying a command or action which the control symbol implements. A short error code field, such as a 5-bit single error correction/double error detection (SECDED) code may be included as a check or double check of some or all of the initial (header) bits.

The 3 bit ackID field of a transmission is assigned by the sending node, starting at zero after a reset and following the sequential procession, 1, 2, 3, 4, 5, 6, 7, 0, 1, etc. Thus, once a transmission is initiated, the receiving node knows what ackID number it is expecting at each stage. Packets are only accepted by the receiving node in the sequential order specified by the ackID, and the receiving node may indicate proper receipt by returning a PACKET_ACCEPTED control symbol back to the sending node. This ordering allows a receiving device to detect when a packet has been lost by internal checks, and also provides a mechanism for maintaining ordering.

FIG. 5b illustrates a suitable format for such a PACKET_ACCEPTED ACKNOWLEDGMENT control symbol. It includes the control symbol S bit S=1, the 3-bit acknowledgment for the received packet ackID that had been assigned by the original sending node (here referred to as the target ackID, since the upstream sending node is now the target of the PACKET ACCEPTED AKNOWLEDGMENT control symbol), a 4-bit buffer status field (buf_status) and a 3-bit control symbol type indicator (stype). A 5-bit single error correction/double error detection (SECDED) error code is also provided, which allows the upstream node to check for corruption of the acknowledgment control symbol.

A receiving node may also "retry" a packet, by returning a PACKET_RETRY acknowledgment control symbol to the sender. This control symbol signals the sender to transmit the affected packet again. The PACKET_RETRY acknowledgment control symbol may be sent in response to some temporary internal condition of the receiving node, such as having all its message handling buffers full or having its processor or handling logic fully occupied with another transaction. The receiving device then silently discards all new incoming packets until it receives a control symbol from the sender indicating it should restart from the retry point. The sender then retransmits all packets starting from the retried ackID, reestablishing the proper ordering between the devices. The packet sent with the retried ackID may be the original retried packet, or may be a higher priority packet (if one is available for transmission), as discussed in the aforesaid BUS PROTOCOL INDEPENDENT METHOD patent application, thus allowing higher priority packets to bypass lower priority packets across the link and avoid deadlock.

Thus, the PACKET_RETRY acknowledgment control symbol allows an intervening link in the fabric to reconstitute an interrupted packet, without discarding and repeating the full transaction, and without waiting for message assembly and retransmission requests from an end point device to which the transaction was addressed. Further details of operation are set forth in the flow charts of Appendix A, filed herewith.

Embodiments of the invention further include error detection and correction mechanisms to guard against corruption or loss of data. These may include error detection or correction codes both for the initial header information for a control symbol or a message packet, and for the remaining data in the case of message packets.

In accordance with further aspects of the invention, if a receiving node encounters an error condition it may send a PACKET_NOT_ACCEPTED control symbol. This control symbol preferably includes an error-type code indicating the error condition that caused non-acceptance. Once a faulty packet has been identified, the receiving node discards all new incoming packets until retry is effected. This assures that packet order of the transmission is maintained. If the error condition is due to a transmission error, the node may apply error recovery mechanisms as described further below.

Adjacent nodes may use control symbols for operations such as reserving buffer space for different priority packets to be sent. The buffer status field of the PACKET_RETRY control symbol serves to notify the sender of available buffer space. When this information is passed between adjacent nodes on a link, a sender may implement a transmission protocol to stop transmitting packets when no receiving packet buffer is available, or stop until a high priority packet requires transmission, or until sufficient buffer space is freed to resume packet transmission.

Different embodiments may be implemented with only a small amount of buffering available; in that case the node may be set up to operate like an input FIFO, or data stream buffer. Such an embodiment may have insufficient buffering for even one large packet, and may depend upon cyclic buffering, i.e., resource reuse, to send and receive large packets. In that case, the buffer status field may simply indicate the maximum number of buffers, and the node may rely on other flow control mechanisms to manage the interface packet stream.

Operation of these message handling steps and detection or correction of errors are made more efficient by a combination of error protection mechanisms that operate successively and in coordination with the packet transmissions.

In accordance with one embodiment of the error detection mechanism of the present invention, packets sent to a node employ one or more CRC codes, and preferably also apply a simple error correct/detect code (e.g., a SECDED) to provide a combination of enhanced integrity and speed of processing. This combination of different error checks allows errors to be detected or corrected at the link level with minimal impact on data transfer speed. A preferred embodiment applies a CRC to portions of a packet that do not change as the packet passes through the link fabric. These may be, for example, portions of the packet outside the physical layer/header fields. A simple error code may then be applied to one or more changing fields within the header or initial bits. This avoids having the interconnect fabric regenerate a CRC value as the packet moves through the fabric, thus avoiding a time consuming and computationally intensive step at each link.

Other embodiments may alternatively, rather than applying a simple SECDED or similar error code, detect transmission errors (such as in control symbols) in hardware, for example as inconsistencies or violations of the control symbol format or protocol. This is possible since control symbols are heavily coded and any out of place bits will result in detection of an undefined state or error condition.

FIG. 5 shows by way of example, a format for the physical layer fields of a request or response packet header in line (a), and shows in line (b) a format for the physical layer fields of a control symbol. These physical layer fields of the packet, line (a) are preferably prepended to other logical fields in the packet, as indicated in line (c). This produces a packet wherein initial header bits relate to processing or operation of transmission on the link, while later bits relate to packet contents or aspects of packet handling.

The aforesaid United States patent application for METHOD AND APPARATUS FOR MAINTAINING PACKET ORDERING WITH ERROR RECOVERY AMONG MULTIPLE OUTSTANDING PACKETS BETWEEN TWO DEVICES describes operation of two connected devices using retry protocols to correct a received packet when it is received out of order (e.g., with an unexpected ackID as described above) or is found by an error detection module operating in a receiver to have an error. The present invention combines multiple different error detection mechanisms to portions of packets or control symbols to more effectively detect substantially all errors and provide continuous but highly efficient error protection as a packet moves through the interconnect fabric. The use of different error protection mechanisms for different portions of a message allows changeable parts of the message to be protected efficiently on each link, while avoiding re-calculation of computationally burdensome error protection codes (such as a CRC) on major portions of the message as it moves trough the link fabric.

The control symbols may be protected in two ways: i) the ackID and stype fields may be protected by a single error correct, double error detect (SECDED) code, discussed further below in connection with FIG. 10, below; and ii) the entire control symbol may be protected by the bit-wise inversion of the symbol used to align it to the 32-bit word boundary described above. This format redundancy allows precise error correction and detection.

When providing a SECDED for error coverage of the control symbols, it is not necessary to cover all bits. The S bit and the buf_status field need not be covered with the SECDED code. This is because a failure in the S bit will cause the control symbol to be interpreted as a packet, which will therefore either be rejected due to an unexpected ackID value, or will generate a CRC error when a CRC code is applied to the complete packet transmission. The buffer status field also need not be protected by the error correction mechanism because this field is present in most control symbols, including idle symbols discussed in the foregoing patent application Ser. No. 09/758,949. Further, this field is protected by the bit-wise inversion in the second half of the symbol. An error in this field need not be treated as an error condition because it is always an informative field that is not critical for proper system behavior. It serves to inform an adjacent node of the available number of packet buffers in the sending node. Thus, for example, if a corrupt value of buf_status occurs, a low value may temporarily prevent a packet from being issued, or a high value may result in a packet being issued when it should not have been, causing temporary overload or congestion, and resulting in a retry. In either case the problems are temporary and will properly resolve themselves through the protocol for transmission pacing or flow control.

FIG. 6 illustrates such error protection coverage for a typical control symbol. As shown, the physical layer field other than the S and buf_status fields are covered by SECDED error protection.

Message packets as described above are preferably protected with a CRC code that also covers the two bit message-handling priority code field described above. The S and ackID fields need not be protected with an SECDED code (as with the control symbols), but instead are protected by protocol as described below. The reserved bits in a packet are assigned to logic 0 when the packet is generated, and are ignored when a packet is received. The reserved field is added to the combined flow control, transport, and logical packet as shown in FIG. 7. The two reserved bits adjacent to the prio field are also protected with the CRC. The new reserved field is unshaded, the related fields are lightly shaded, and the unrelated preceding and following bits of the transmission are illustrated as heavily shaded.

FIG. 8 shows the error coverage for the first 16 bits of a packet header. CRC protects the prio, tt, and ftype fields and two of the reserved bits. (The it field specifies certain system specifics, such as whether device IDs are 8- or 16-bit, and the ftype identifies the packet format type.) There is for each new packet an expected value for the ackID field at the receiver, bit errors on this field are easily detected and a error in this field causes the packet to be not accepted due to the unexpected value. An error on the S bit causes the packet to be misinterpreted as a control symbol, which is statistically likely to assure detection of an error state, either because the control symbols are very heavily encoded or because of an induced protocol violation such as an unexpected ackID value. Errors on the two unprotected reserved bits can be ignored.

Thus, all of the necessary initial information appearing in a control symbol or a packet header, or all of the changing fields that may vary from link to link, is protected against errors. The CRC that covers the major portion of a packet does not need regenerate a packet CRC value each time the uncovered physical layer fields are assigned as messages pass along the links of the interconnect.

It should be observed that even with these error detection mechanisms, and with the retry and correction mechanisms described in the aforesaid PACKET ORDERING patent application, some types of errors, such as a lost request or response packet or a lost acknowledgment, result in a system with hung resources. Preferably, to detect this type of error, time-out counters are provided that expire when sufficient time has elapsed without receiving the expected response from the system. Because the expiration of one of these timers should indicate to the system that there is a problem, this time interval should be set long enough to avoid signaling a false time out. The response to this error condition may be system dependent.

For example, an implementation may have one-time out counter for the logical layer and another for the physical layer. The logical layer time out occurs between the issue of a request transaction and the receipt of the response. The time-out interval for this packet pair is likely to be fairly long. The physical layer time out occurs between the transmission of a packet and the receipt of an acknowledgment symbol. This time-out interval is likely to be comparatively short because the packet and acknowledge pair only has to traverse a single link. For the purposes of error recovery in the case of a time-out on an acknowledge control symbol the time-out should be treated as (e.g., the node responds as though it were) an unexpected acknowledge control symbol rather than a corrupt control symbol. Such time-out registers may be specified depending upon a number of factors such as the link clock rate, the internal clock rate of the device, and the desired system behavior in an implementation dependent manner.

Error detection and correction is preferably done at the input port, and all recovery also initiated at the input port. Error detection can be done in a number of ways and at differing levels of complexity and robustness depending upon the requirements and implementation of a device. For example, a device may be implemented that ignores the SECDED capability on received control symbols and treats all potentially correctable errors as not correctable, resulting in a simple but lower performance design. Another device may be implemented to ignore the redundant half of an aligned control symbol and use the SECDED code as the only means of error detection and correction, resulting in a simple but less robust design.

Control symbols can recover silently from single bit errors on an aligned control symbol, described in FIG. 9A, and from a number of multiple bit errors, described in FIG. 9B. The column labeled "bit mismatch" of that Figure refers to comparing the two redundant halves of an aligned control symbol.

Attached hereto as Appendix A are SECDED error tables for the SECDED code defined in FIG. 10, as well as six charts, numbered FIGS. A-1 to A-6 showing details of the initialization and the operation of sending and receiving nodes for message handling and error recovery steps. Two kinds of errors are detected at an input port: an error on a packet and an error on a control symbol.

Three types of packet errors exist: a packet with an unexpected ackID value, a corrupted packet indicated by a bad CRC value, or a packet that overruns some defined boundary such as the maximum data payload or a transactional boundary defined for its packet type. A node processing element that detects a packet error immediately transitions into an "input stopped due to transmission error" state and silently discards all new packets until it receives a restart-from-error control symbol from the sender. The device also sends a packet-not-accepted control symbol with the received ackID value back to the sender. The sender then initiates recovery (described below) for unexpected control symbols.

The two types of control symbol errors are i) an uncorrupted packet-accepted, packet-retry, or packet-not-accepted control symbol (which is either unsolicited or has an unexpected ackID value) or ii) a corrupt control symbol. The first case, an uncorrupted protocol violating acknowledgment (due to the unexpected ackID value), causes the receiving device to enter an "output stopped due to transmission error" state, immediately stop transmitting new packets, and issue a restart-from-error control symbol. The restart-from-error control symbol receives a response from the downstream node containing pertinent receiver internal state, including the expected ackID. This expected ackID indicates to the sender where to begin re-transmission because the interface may have gotten out of sequence. The sender then backs up to the appropriate unaccepted packet and begins re-transmission.

For example, the sender may transmit packets labeled ackID 2, 3, 4, and 5, and receive acknowledges for packets 2 and 4, indicating a probable error associated with ackID 3. The sender then stops transmitting new packets and sends a link-request for link status control symbol to the receiver. The receiver then returns a link-response control symbol indicating which packets it has received properly. The following are the possible responses and the sender's resulting behavior:

expecting ackID=3–sender must re-transmit packets 3, 4, and 5 expecting ackID=4–sender must re-transmit packets 4 and 5 expecting ackID=5–sender must re-transmit packet 5 expecting ackID=6–receiver got all packets, resume operation expecting ackID=anything else–fatal (non-recoverable) error The second case (namely, a corrupt control symbol) again causes the receiver to enter the "input stopped due to transmission error" state and send a packet-not-accepted control symbol with an unexpected ackID value to the sender. This informs the sending device that a transmission error has occurred and it will enter the recovery process described in the first control symbol error case described above. A special case occurs with a corrupt embedded control symbol. (Embedded control symbols, i.e., those sent within a message packet, are described in the aforesaid LEVEL MESSAGE FLOW CONTROL patent application.) In this case the packet-not-accepted control symbol contains the ackID value of the embedding packet, and the packet is discarded.

As noted above a SECDED code may protect initial parts (e.g., physical layer fields) of a message. Table A of FIG. 10 contains a suitable single error correct, double error detect (SECDED) code for the physical layer fields and the control symbols. Data bits marked in the table are exclusive-OR'ed together to generate the protection bits. These bits correspond to the covered ackID and stype fields as shown in Table B of FIG. 10.

The major portion of a message packet is preferably protected by a cyclic redundancy code (CRC). In a prototype embodiment, a 16-bit CRC was selected as the preferred method of error detection for the end point physical layer. This CRC is generated over all of a packet header and all of the data payload except the first 6 bits of the added physical layer fields as shown above. The initial value of the CRC is 0xFFFF, or all logic 1s. For purposes of simplifying CRC calculation, the uncovered 6 bits are assumed to be logic 0s. This checksum is appended to a packet in one of two ways. For a packet that has up to 80 bytes of header (including all logical, transport, and physical link protocol fields) and logical data payload, a single CRC value is appended to the packet.

For packets with greater than 80 bytes of header and logical data payload, one CRC value is inserted after the first 80 bytes, aligning it to the first half of the 32-bit word alignment boundary, and a second CRC value is appended at the end of the packet. The second CRC value is a continuation of the first and included in the running calculation. That is, the running CRC value is not re-initialized after it is inserted after the first 80 bytes of the packet. This allows intervening devices to regard the embedded first CRC value as 2 bytes of packet payload for CRC checking purposes.

Advantageously, the embedded CRC value is itself used in the running CRC. As a result, from the CRC generator's point of view the running CRC value is guaranteed to be all logic 0's because the running CRC is XOR'ed with itself. This property is expected to be useful in an implementation.

The first or early CRC value can be used by the receiving end point to validate the header of a large packet, and to start processing the received data before the entire packet has been received. This frees up resources earlier and reduces transaction completion latency. If the final appended CRC value does not cause the total packet to align to the 32-bit boundary, a 2 byte pad of all logic 0s is postpended to the packet. Such pad of logic 0s allows the CRC check to always be done at the 32-bit boundary.

Switch devices in the link fabric must maintain the packet error coverage internally in order to preserve the integrity of the packets though the fabric. This will prevent device internal errors such as SRAM bit errors from silently corrupting the system. The simplest method for preserving error coverage is to pass the CRC values through the switch as part of the packet.

FIG. 11A illustrates one example of a naturally 32-bit aligned packet of less than or equal to 80 bytes. FIG. 11B illustrates an example of a naturally 32-bit aligned packet of greater than 80 bytes. FIG. 11C illustrates an example of a padded 32-bit aligned packet of less than or equal to 80 bytes. FIG. 11D illustrates an example of a padded 32-bit aligned packet of greater than 80 bytes.

Figure 12:
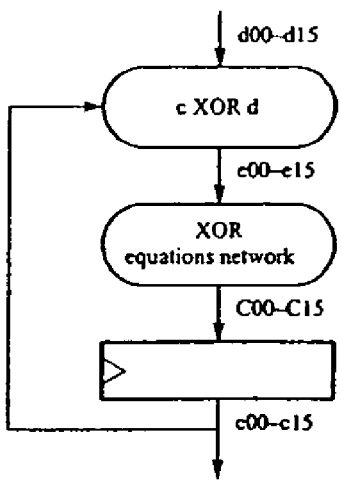

One suitable CRC is given by the CCITT polynomial $X^{16}+X^{12}+X^{5}+1$. FIG. 12 illustrates, by way of example, a 16-bit wide parallel calculation for this polynomial. Equivalent implementations of other widths can be employed. In the Figure, C00–C15 indicate contents of the new check symbol, e00–e15 indicate contents of intermediate value symbols (e.g., successive steps in the computation e00=d00 XOR c00, e01=d01 XOR c01, . . . ), where d00–d15 are the contents of the next 16 bits of the packet, and c00–c15 are the contents of the previous check symbol for the pipeline shown in FIG. 12A.

Hop Count

It will be understood that systems of the present invention may form a network, and are particularly advantageous for implementation of networks wherein processors, devices or directly accessed memory may be distributed and addressable in the network. Formats of particular message packets may be configured to include address or extended address fields for efficiently carrying out direct writes, reads or other functions to such memory, processor or other devices. Among the transactions that may be effected are maintenance or administrative type transactions, such as querying a control and status register of a node to determine its availability for receiving message packets or to configure routing of such packets.

In many instances, the intermediate nodes of a link fabric network, such as switches, need not have a device ID, yet it may still be desirable to address such nodes, for example to determine their availability, or to set up or reconfigure a route between end point nodes for a data transmission.

In this case, control messages for effecting such queries or transactions may be sent to a node by including a "hop count" field in the control message. As this message passes along the link fabric, each node inspects the hop count field, and if it is non-zero, decrements the hop count by one, and passes the control message to the next link. When the hop count field is zero, a receiving node then reads and implements the command or transaction indicated by the message content. Thus, intermediate nodes may be addressed in the manner of a token passing ring, for effecting such transactions as reading registers, determining buffer status, reserving ports and other administrative or handshake functions. This manner of addressing intermediate nodes of the link fabric allows much of the administration of link level communications to be carried on without having to configure hardware for an excessively large number of device IDs.

The invention being thus disclosed and illustrative embodiments described herein, further variations, modifications and adaptations thereof will occur to those skilled in the art, and all such variations, modifications and adaptations are considered to be within the scope of the invention, as defined herein, and by the claims appended hereto and equivalents thereof.

Appendix A
Interface Management

This appendix contains state machine descriptions that illustrate a number of behaviors that are described in the accompany patent application.

A.1 SECDED Code Error Tables

This section contains the single error correct and double detect error syndromes for the code used to protect the transaction type for the control symbols. The code is defined in Figure 10A. Errors are detected by generating parity over the syndrome and conditioning that result with an AND of the syndrome to detect the all five bits set case, which is a multiple bit error, not a single bit error.

Table A-1. Single Bit Failure Table

| Received SECDED Bit | | | | | Received Data Bit | | | | | | Syndrome |
|---|---|---|---|---|---|---|---|---|---|---|---|
| 0 | 1 | 2 | 3 | 4 | 0 | 1 | 2 | 3 | 4 | 5 | |
| F | | | | | | | | | | | 1 0 0 0 0 |
| | F | | | | | | | | | | 0 1 0 0 0 |
| | | F | | | | | | | | | 0 0 1 0 0 |
| | | | F | | | | | | | | 0 0 0 1 0 |
| | | | | F | | | | | | | 0 0 0 0 1 |
| | | | | | F | | | | | | 0 1 1 1 0 |
| | | | | | | F | | | | | 1 1 0 1 0 |
| | | | | | | | F | | | | 1 0 1 1 0 |
| | | | | | | | | F | | | 1 1 1 0 0 |
| | | | | | | | | | F | | 1 1 0 0 1 |
| | | | | | | | | | | F | 1 0 1 0 1 |

Physical Layer 8/16 LP-LVDS Specification

Table A-2. Double Bit Failure Table

| Received SECDED Bit | | | | | Received Data Bit | | | | | | Syndrome |
|---|---|---|---|---|---|---|---|---|---|---|---|
| 0 | 1 | 2 | 3 | 4 | 0 | 1 | 2 | 3 | 4 | 5 | |
| F | F | | | | | | | | | | 1 1 0 0 0 |
| F | | F | | | | | | | | | 1 0 1 0 0 |
| F | | | F | | | | | | | | 1 0 0 1 0 |
| F | | | | F | | | | | | | 1 0 0 0 1 |
| F | | | | | F | | | | | | 1 1 1 1 0 |
| F | | | | | | F | | | | | 0 1 0 1 0 |
| F | | | | | | | F | | | | 0 0 1 1 0 |
| F | | | | | | | | F | | | 0 1 1 0 0 |
| F | | | | | | | | | F | | 0 1 0 0 1 |
| F | | | | | | | | | | F | 0 0 1 0 1 |
| | F | F | | | | | | | | | 0 1 1 0 0 |
| | F | | F | | | | | | | | 0 1 0 1 0 |
| | F | | | F | | | | | | | 0 1 0 0 1 |
| | F | | | | F | | | | | | 0 0 1 1 0 |
| | F | | | | | F | | | | | 1 0 0 1 0 |
| | F | | | | | | F | | | | 1 1 1 1 0 |
| | F | | | | | | | F | | | 1 0 1 0 0 |
| | F | | | | | | | | F | | 1 0 0 0 1 |
| | F | | | | | | | | | F | 1 1 1 0 1 |
| | | F | F | | | | | | | | 0 0 1 1 0 |
| | | F | | F | | | | | | | 0 0 1 0 1 |
| | | F | | | F | | | | | | 0 1 0 1 0 |
| | | F | | | | F | | | | | 1 1 1 1 0 |
| | | F | | | | | F | | | | 1 0 0 1 0 |
| | | F | | | | | | F | | | 1 1 0 0 0 |
| | | F | | | | | | | F | | 1 1 1 0 1 |
| | | F | | | | | | | | F | 1 0 0 0 1 |
| | | | F | F | | | | | | | 0 0 0 1 1 |
| | | | F | | F | | | | | | 0 1 1 0 0 |
| | | | F | | | F | | | | | 1 1 0 0 0 |
| | | | F | | | | F | | | | 1 0 1 0 0 |

SECDED Code Error Tables

Table A-2. Double Bit Failure Table (Continued)

| Received SECDED Bit | | | | | Received Data Bit | | | | | | Syndrome |
|---|---|---|---|---|---|---|---|---|---|---|---|
| 0 | 1 | 2 | 3 | 4 | 0 | 1 | 2 | 3 | 4 | 5 | |
|  |  |  | F |  |  |  |  | F |  |  | 1 1 1 1 0 |
|  |  |  | F |  |  |  |  |  | F |  | 1 1 0 1 1 |
|  |  |  | F |  |  |  |  |  |  | F | 1 0 1 1 1 |
|  |  |  |  |  |  |  |  |  |  |  |  |
|  |  |  |  | F | F |  |  |  |  |  | 0 1 1 1 1 |
|  |  |  |  | F |  | F |  |  |  |  | 1 1 0 1 1 |
|  |  |  |  | F |  |  | F |  |  |  | 1 0 1 1 1 |
|  |  |  |  | F |  |  |  | F |  |  | 1 1 1 0 1 |
|  |  |  |  | F |  |  |  |  | F |  | 1 1 0 0 0 |
|  |  |  |  | F |  |  |  |  |  | F | 1 0 1 0 0 |
|  |  |  |  |  |  |  |  |  |  |  |  |
|  |  |  |  |  | F | F |  |  |  |  | 1 0 1 0 0 |
|  |  |  |  |  | F |  | F |  |  |  | 1 1 0 0 0 |
|  |  |  |  |  | F |  |  | F |  |  | 1 0 0 1 0 |
|  |  |  |  |  | F |  |  |  | F |  | 1 0 1 1 1 |
|  |  |  |  |  | F |  |  |  |  | F | 1 1 0 1 1 |
|  |  |  |  |  |  |  |  |  |  |  |  |
|  |  |  |  |  |  | F | F |  |  |  | 0 1 1 0 0 |
|  |  |  |  |  |  | F |  | F |  |  | 0 0 1 1 0 |
|  |  |  |  |  |  | F |  |  | F |  | 0 0 0 1 1 |
|  |  |  |  |  |  | F |  |  |  | F | 0 1 1 1 1 |
|  |  |  |  |  |  |  |  |  |  |  |  |
|  |  |  |  |  |  |  | F | F |  |  | 0 1 0 1 0 |
|  |  |  |  |  |  |  | F |  | F |  | 0 1 1 1 1 |
|  |  |  |  |  |  |  | F |  |  | F | 0 0 0 1 1 |
|  |  |  |  |  |  |  |  |  |  |  |  |
|  |  |  |  |  |  |  |  | F | F |  | 0 0 1 0 1 |
|  |  |  |  |  |  |  |  | F |  | F | 0 1 0 0 1 |
|  |  |  |  |  |  |  |  |  |  |  |  |
|  |  |  |  |  |  |  |  |  | F | F | 0 1 1 0 0 |

Physical Layer 8/16 LP-LVDS Specification

A.2 Link Initialization and Maintenance Mechanism

This section contains the link training and initialization state machine pertaining to sampling window alignment. Training takes place in two circumstances; when coming out of reset and after the loss of reliable input port sampling during system operation.

Link initialization and maintenance actually requires two inter-dependant state machines in order to operate, one associated with the input port and the other with the output port. The two state machines work together to complete the link training. The state machines are intended for a device with an 8-bit port or a device with a 16-bit port. The port can only transition from the "Port Unitialized" state to the "Port OK" state when both halves of the state machine are in their OK state.

A.2.1 Input port training state machine

Figure A-1 illustrates the input port training state machine. Error conditions are only detectable while in the "OK" states (OK and OK_maint_trn). The optional OK_maint_trn state, shaded in Figure A-1, is used to adjust the device input port sampling circuitry during system operation.

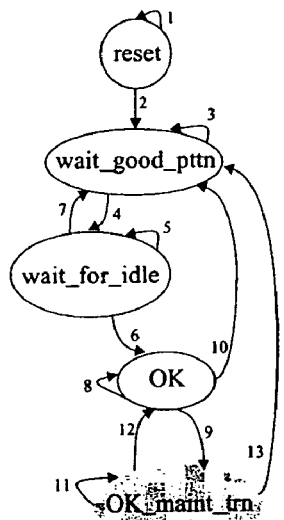

Figure A-1. Input port training state machine

Table A-3 describes the state transition arcs for Figure A-1.

Link Initialization and Maintenance Mechanism

Table A-3. Input port training state machine transition table

| Arc | Current State | Next state | cause | Comments |
|---|---|---|---|---|
| 1 | reset | reset | Start training condition not met. | Remain in the reset state until the start training condition is met. Typically, this is after reset has been applied to the device and all other necessary initialization activity has completed. |
| 2 | reset | wait_good_pttn | Start training condition met. | This state is entered after all initialization activity has completed for the device. |
| 3 | wait_good_pttn | wait_good_pttn | The defined training pattern has not been detected yet. Wait for the sampling circuitry to indicate that the defined training pattern has been received and the sampling circuitry is calibrated. | Remain in this state until the defined training pattern is detected. |
| 4 | wait_good_pttn | wait_for_idle | Sampling circuitry is calibrated and the defined training pattern has been received. | Upon recognizing the defined training pattern, a 16-bit port can decide whether it's output port needs to be downgraded to drive in 8-bit mode. Request the output port to start sending idle control symbols. |
| 5 | wait_for_idle | wait_for_idle | Remain in this state until an exit condition occurs. | In this state, only training patterns and the idle and link-request/send-training control symbols are legal. |
| 6 | wait_for_idle | OK | Idle control symbol has been received and the output port is in the "send_idles" state. | This transition indicates that the input port is ready to start receiving packets and other control symbols. |
| 7 | wait_for_idle | wait_good_pttn | The input port receives something besides a training pattern, idle, or link-request/send-training control symbol, or the sampling circuitry is no longer calibrated. | Receiving something unexpected or when the sampling circuitry is no longer able to reliably sample the device pins causes both the input port and output port to start restart the training sequence. |
| 8 | OK | OK | Sampling circuitry remains calibrated and is not drifting. | This is a functional state in which packets and control symbols can be accepted. Errors are also reported in this state. |
| 9 | OK | OK_maint_tm | Sampling circuitry drift. | This transition takes place when the sampling circuitry can still reliably sample the device pins, but adjustment is required to prevent eventual loss of calibration. |
| 10 | OK | wait_good_pttn | Sampling circuitry is no longer calibrated. | Both the input port and output port restart the training sequence when the sampling circuitry is no longer able to reliably sample the device pins. This error invokes the error recovery algorithm when the OK state is re-entered to attempt to recover possible lost data. |

Appendix A. Interface Management
RapidIO Trade Association Confidential

IV-93

Physical Layer 8/16 LP-LVDS Specification

Table A-3. Input port training state machine transition table

| Arc | Current State | Next state | cause | Comments |
|---|---|---|---|---|
| 11 | OK_maint_trn | OK_maint_trn | The complete sequence of 256 training patterns has not been received, and the sampling circuitry is still calibrated. | This is a functional state in which packets and control symbols can be accepted. Errors are also reported in this state. In this state, the device adjusts the sampling circuitry when the training patterns are received. |
| 12 | OK_maint_trn | OK | The complete sequence of 256 training patterns has been received and the sampling circuitry is still calibrated. | Sampling circuitry has been adjusted. |
| 13 | OK_maint_trn | wait_good_pttn | Sampling circuitry is no longer calibrated. | Both the input port and output port restart the training sequence when the sampling circuitry is no longer able to reliably sample the device pins. This error invokes the error recovery algorithm when the OK state is re-entered to attempt to recover possible lost data. |

A.2.2 Output port training state machine

Figure A-2 illustrates the output port training state machine. Packets can only be transmitted when both the input port and output port are in their "OK" states (OK and OK_maint_trn for the input port, and OK, OK_send_trn_req and OK_send_trn_pttn for the output port). The 8-bit mode adjustment state for a 16-bit port is heavily shaded in Figure A-2, and is not required for 8-bit ports. The optional OK_maint_trn state, lightly shaded in Figure A-2, is used to adjust the device input port sampling circuitry during system operation, and is associated with the OK_maint_trn state in the input port state machine.

Link Initialization and Maintenance Mechanism

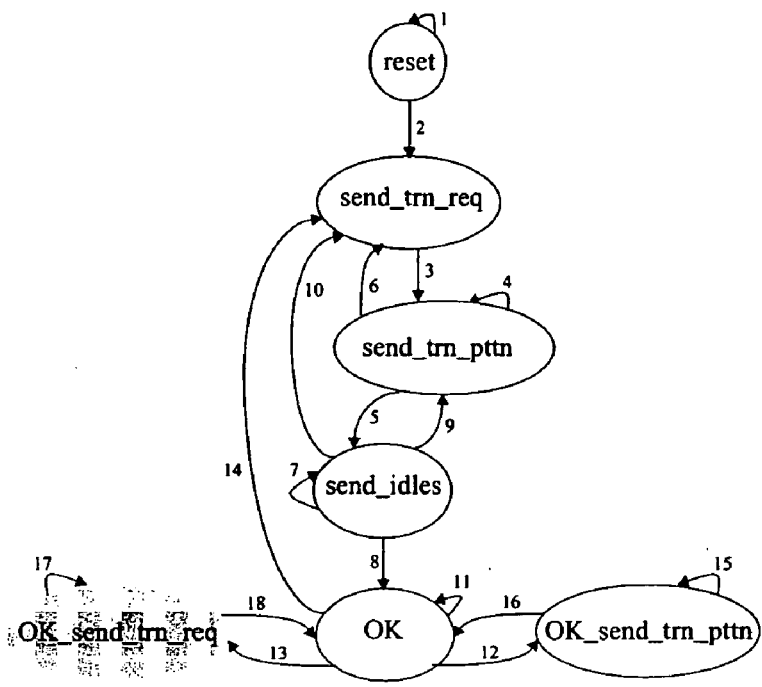

Figure A-2. Output port training state machine

Table A-4 describes the state transition arcs for Figure A-2.

Table A-4. Output port training state machine transition table

| Arc | Current State | Next state | cause | Comments |
|---|---|---|---|---|
| 1 | reset | reset | Start training condition not met. | Remain in the reset state until the start training condition is met. Typically, this is after reset has been applied to the device and all other necessary initialization activity has completed. |
| 2 | reset | send_trn_req | Start training condition met. | This state is entered after all initialization activity has completed for the device. The output port will send a link-request/send-training control symbol |
| 3 | send_trn_req | send_trn_pttn | Unconditional transition. | The output port will send 256 iterations of the training pattern |
| 4 | send_trn_pttn | send_trn_pttn | The 256 iterations of the training pattern is not completed. | The input port is waiting to calibrate and receive the defined training pattern. The output port is sending training patterns. |

Physical Layer 8/16 LP-LVDS Specification

Table A-4. Output port training state machine transition table

| Arc | Current State | Next state | cause | Comments |
|---|---|---|---|---|
| 5 | send_trn_pttn | send_idles | The 256 iterations of the training pattern is completed and the input port has requested to send idle control symbols. | The input port sampling circuitry is calibrated and the input port has received the defined training pattern. In the send_idles state, idle control symbols are sent out on the output port. |
| 6 | send_trn_pttn | send_trn_req | The 256 iterations of the training pattern are completed but the input port has not requested to send idle control symbols. | Remain in the send_trn_req - send_trn_pttn loop until the input port sampling circuitry is calibrated and the input port recognizes the defined training pattern and then requests to send idle control symbols. A link-request/send-training control symbol is sent out in state send_trn_req. |
| 7 | send_idles | send_idles | Remain in this state until an exit condition occurs. | A reset to the beginning of the training sequence occurs on input port transitions into the wait_good_pttn state. Idle control symbols are sent on the output port in this state. |
| 8 | send_idles | OK | The input port is in state wait_for_idle and has received an idle control symbol. | Ready to start sending packets and any control symbol. |
| 9 | send_idles | send_trn_pttn | A link-request/send-training is received on the input port. | The output port will send 256 iterations of the of the training pattern as requested. |
| 10 | send_idles | send_trn_req | The input port asks for a reset back to the beginning of the training sequence. | Transition to send_trn_req and start over. |
| 11 | OK | OK | A link-request/send-training is not received on the input port and the input port does not ask for a reset to the beginning of the training sequence. | This is a functional state in which packets and control symbols are transmitted. Errors are detected and reported in this state. |
| 12 | OK | OK_send_trn_pttn | link-request/send-training is received on the input port. | This transition occurs when in the OK state and a training request is received from the attached device. |
| 13 | OK | OK_send_trn_req | The input port wants the attached device to send 256 iterations of the training pattern. | This transition occurs when in the OK state and input port sampling circuitry needs to be adjusted, and is associated with the optional input port OK_maint_trn state. |
| 14 | OK | send_trn_req | The input port asks for a reset to the beginning of the training sequence. | Transition to send_trn_req and start over. This occurs when the sampling circuitry is no longer able to reliably sample the device pins. |

Link Initialization and Maintenance Mechanism

Table A-4. Output port training state machine transition table

| Arc | Current State | Next state | cause | Comments |
|---|---|---|---|---|
| 15 | OK_send_trn_pttn | OK_send_trn_pttn | The 256 iterations of the training pattern is not completed. | The output port is sending training patterns. Errors are detected and reported in this state. Must send at least one idle control symbol after the 256 iterations. |
| 16 | OK_send_trn_pttn | OK | The 256 iterations of the training pattern are completed and followed by at least one idle control symbol. | This is a normal operating case where the attached device requested that we send training patterns. |
| 17 | OK_send_trn_req | OK_send_trn_req | Waiting to send the link-request/send-training | Might have to wait for the end of the current packet because link-request control symbols can not be embedded. Errors are detected and reported in this state. |
| 18 | OK_send_trn_req | OK | link-request/send-training sent out on the output port as requested by the input port. | Input port is requesting training patterns from the other end to adjust its sampling circuitry. |

Physical Layer 8/16 LP-LVDS Specification

A.3 Packet Retry Mechanism

This section contains the example packet retry mechanism state machine pertaining to flow control and transaction delivery ordering.

Packet retry recovery actually requires two inter-dependant state machines in order to operate, one associated with the input port and the other with the output port on the two connected devices. The two state machines work together to attempt recovery from a retry condition.

A.3.1 Input port retry recovery state machine

If a packet cannot be accepted by a receiver for reasons other than error conditions, such as a full input buffer, the receiver follows the state sequence shown in Figure A-3.

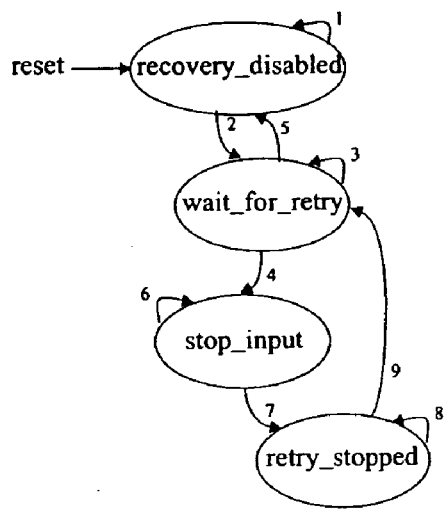

Figure A-3. Input port retry recovery state machine

Table A-5 describes the state transition arcs for Figure A-3. The states referenced in the comments in quotes are the RapidIO 8/16 LP-LVDS defined status states, not states in this state machine.

Packet Retry Mechanism

Table A-5. Input port retry recovery state machine transition table

| Arc | Current State | Next state | cause | Comments |
|---|---|---|---|---|
| 1 | recovery_disabled | recovery_disabled | Remain in this state until the input port is enabled to receive packets. | This is the initial state after reset. The input port can't be enabled before the training sequence has been completed, and may be controlled through other mechanisms as well, such as a software enable bit. |
| 2 | recovery_disabled | wait_for_retry | Input port is enabled. | |
| 3 | wait_for_retry | wait_for_retry | Remain in this state until a packet retry situation has been detected. | |
| 4 | wait_for_retry | stop_input | A packet retry situation has been detected. | Usually this is due to an internal resource problem such as not having packet buffers available for low priority packets. |
| 5 | wait_for_retry | recovery_disabled | Input port is disabled. | |
| 6 | stop_input | stop_input | Remain in this state until described input port stop activity is completed. | Send a packet-retry control symbol with the expected ackID, discard the packet, and don't change the expected ackID. This will force the attached device to initiate recovery starting at the expected ackID. Clear the "Port OK" state and set the "Input Retry-stopped" state. |
| 7 | stop_input | retry_stopped | Input port stop activity is complete. | |
| 8 | retry_stopped | retry_stopped | Remain in this state until a restart-from-retry or restart-from-error control symbol is received or an input port error is encountered. | The "Input Retry-stopped" state causes the input port to silently discard all incoming packets and not change the expected ackID value. |
| 9 | retry_stopped | wait_for_retry | Received a restart-from-retry or a restart_from_error control symbol or an input port error is encountered. | The restart_from_error control symbol is a link-request/input-status control symbol. Clear the "Input Retry-stopped" state and set the "Port OK" state. An input port error shall cause a clean transition between the retry recovery state machine and the error recovery state machine. |

A.3.2 Output port retry recovery state machine

On receipt of an error-free packet-retry acknowledge control symbol, the attached output port follows the behavior shown in Figure A-4. The states referenced in the comments in quotes are the RapidIO 8/16 LP-LVDS defined status states, not states in this state machine.

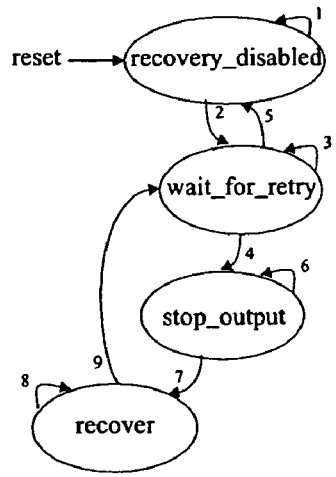

Figure A-4. Output port retry recovery state machine

Table A-6 describes the state transition arcs for Figure A-4.

Table A-6. Output port retry recovery state machine transition table

| Arc | Current State | Next state | cause | Comments |
|---|---|---|---|---|
| 1 | recovery_disabled | recovery_disabled | Remain in this state until the output port is enabled to receive packets. | This is the initial state after reset. The output port can't be enabled before the training sequence has been completed, and may be controlled through other mechanisms as well, such as a software enable bit. |
| 2 | recovery_disabled | wait_for_retry | Output port is enabled. | |
| 3 | wait_for_retry | wait_for_retry | Remain in this state until a packet-retry control symbol is received. | The packet-retry control symbol shall be error free. |
| 4 | wait_for_retry | stop_output | A packet-retry control symbol has been received. | Start the output port stop procedure. |
| 5 | wait_for_retry | recovery_disabled | Output port is disabled. | |
| 6 | stop_output | stop_output | Remain in this state until the output port stop procedure is completed. | Clear the "Port OK" state, set the "Output Retry-stopped" state, and stop transmitting new packets. |
| 7 | stop_output | recover | Output port stop procedure is complete. | |

Packet Retry Mechanism

Table A-6. Output port retry recovery state machine transition table

| Arc | Current State | Next state | cause | Comments |
|---|---|---|---|---|
| 8 | recover | recover | Remain in this state until the internal recovery procedure is completed. | The packet sent with the ackID value returned in the packet-retry control symbol and all subsequent packets shall be re-transmitted. Output port state machines and the outstanding ackID scoreboard shall be updated with this information, then clear the "Output Retry-stopped" state and set the "Port OK" state to restart the output port.<br><br>Receipt of a packet-not-accepted control symbol or other output port error during this procedure shall not cause cause a clean transition between the retry recovery state machine and the error recovery state machine. |
| 9 | recover | wait_for_retry | Internal recovery procedure is complete. | Re-transmission has started, so return to the wait_for_retry state to wait for the next packet-retry control symbol. |

Physical Layer 8/16 LP-LVDS Specification

A.4 Error Recovery

This section contains the error recovery state machine link behavior under error.

Error recovery actually requires two inter-dependant state machines in order to operate, one associated with the input port and the other with the output port on the two connected devices. The two state machines work together to attempt recovery.

A.4.1 Input port error recovery state machine

There are a variety of recoverable error types.
The first group of errors are associated with the input port, and
consists mostly of corrupt packet and control symbols. An example of a corrupt packet is a packet with an incorrect CRC. A example of a corrupt control symbol is a control symbol where the second 16 bits are not an inversion of the first 16 bits. The recovery state machine for the input port of a RapidIO link is shown in Figure A-5.

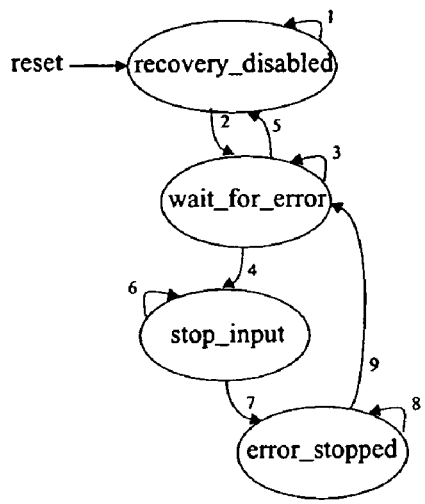

Figure A-5. Input port error recovery state machine

Table A-7 describes the state transition arcs for Figure A-5. The states referenced in the comments in quotes are the RapidIO 8/16 LP-LVDS defined status states, not states in this state machine.

Table A-7. Input port error recovery state machine transition table

| Arc | Current State | Next state | cause | Comments |
|---|---|---|---|---|
| 1 | recovery_disabled | recovery_disabled | Remain in this state until error recovery is enabled. | This is the initial state after reset. Error recovery can't be enabled before the training sequence has been completed, and may be controlled through other mechanisms as well, such as a software enable bit. |
| 2 | recovery_disabled | wait_for_error | Error recovery is enabled. | |
| 3 | wait_for_error | wait_for_error | Remain in this state until a recoverable error is detected. | Detected errors and the level of coverage is implementation dependant. |
| 4 | wait_for_error | stop_input | A recoverable error has been detected. | An output port associated error will not cause this transition, only an input port associated error. |
| 5 | wait_for_error | recovery_disabled | Error recovery is disabled. | |
| 6 | stop_input | stop_input | Remain in this state until described input port stop activity is completed. | Send a packet-not-accepted control symbol and, if the error was on a packet, discard the packet and don't change the expected ackID value. This will force the attached device to initiate recovery. Clear the "Port OK" state and set the "Input Error-stopped" state. |
| 7 | stop_input | error_stopped | Input port stop activity is complete. | |
| 8 | error_stopped | error_stopped | Remain in this state until a restart-from-error control symbol is received. | The "Input Error-stopped" state causes the input port to silently discard all subsequent incoming packets and ignore all subsequent input port errors. |
| 9 | error_stopped | wait_for_error | Received a restart_from_error control symbol. | The restart-from-error control symbol is a link-request/input-status control symbol. Clear the "Input Error-stopped" state and set the "Port OK" state, which will put the input port back in normal operation. |

A.4.2 Output port error recovery state machine

The second recoverable group of errors described in Section 1.3.5, "Link Behavior Under Error" are associated with the output port, and are control symbols that are error-free and indicate that the attached input port has detected a transmission error or some other unusual situation has occurred. An example of this situation is indicated by the receipt of a packet_not_accepted control symbol. Another example is the receipt of a link-request/send-training control symbol, which should cause the error recovery procedure to be followed after responding to the request. The state machine for the output port is shown in Physical Layer 8/16 LP-LVDS Specification Figure A-6.

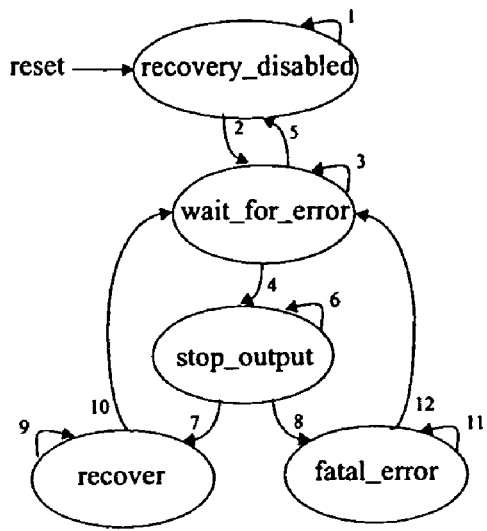

Figure A-6. Output port error recovery state machine

Table A-8 describes the state transition arcs for Figure A-6. The states referenced in the comments in quotes are the RapidIO 8/16 LP-LVDS defined status states, not states in this state machine.

Table A-8. Output port error recovery state machine transition table

| Arc | Current State | Next state | cause | Comments |
|---|---|---|---|---|
| 1 | recovery_disabled | recovery_disabled | Remain in this state until error recovery is enabled. | This is the initial state after reset. Error recovery can't be enabled before the training sequence has been completed, and may be controlled through other mechanisms as well, such as a software enable bit. |
| 2 | recovery_disabled | wait_for_error | Error recovery is enabled. | |
| 3 | wait_for_error | wait_for_error | Remain in this state until a recoverable error is detected. | Detected errors and the level of coverage is implementation dependant. |
| 4 | wait_for_error | stop_output | A recoverable error has been detected. | An input port associated error will not cause this transition, only an output port associated error. |
| 5 | wait_for_error | recovery_disabled | Error recovery is disabled. | |

Error Recovery

Table A-8. Output port error recovery state machine transition table

| Arc | Current State | Next state | cause | Comments |
|---|---|---|---|---|
| 6 | stop_output | stop_output | Remain in this state until an exit condition occurs. | Clear the "Port OK" state, set the "Output Error-stopped" state, stop transmitting new packets, and send a link-request/input-status control symbol. Ignore all subsequent output port errors.<br><br>The input on the attached device is in the "Input Error-stopped" state and is waiting for a link-request/input-status in order to be re-enabled to receive packets.<br><br>An implementation may wish to time-out several times before regarding a time-out as fatal using a threshold counter or some other mechanism. |
| 7 | stop_output | recover | The link-response is received and returned an outstanding ackID value | An outstanding ackID is a value sent out on a packet that has not been acknowledged yet. In the case where no ackIDs are outstanding the returned ackID value shall match the next expected/next assigned ackID value, indicating that the devices are synchronized.<br><br>Recovery is possible, so follow recovery procedure. |
| 8 | stop_output | fatal_error | The link-response is received and returned an ackID value that is not outstanding, or timed out waiting for the link-response. | Recovery is not possible, so start error shutdown procedure. |
| 9 | recover | recover | Remain in this state until the internal recovery procedure is completed. | The packet sent with the ackID value returned in the link-response and all subsequent packets shall be re-transmitted. All packets transmitted with ackID values preceding the returned value were received by the attached device, so they are treated as if packet-accepted control symbols have been received for them. Output port state machines and the outstanding ackID scoreboard shall be updated with this information, then clear the "Output Error-stopped" state and set the 'Port OK" state to restart the output port. |
| 10 | recover | wait_for_error | The internal recovery procedure is complete. | Re-transmission (if any was necessary) has started, so return to the wait_for_error state to wait for the next error. |

Physical Layer 8/16 LP-LVDS Specification

Table A-8. Output port error recovery state machine transition table

| Arc | Current State | Next state | cause | Comments |
|---|---|---|---|---|
| 11 | fatal_error | fatal_error | Remain in this state until error shutdown procedure is completed. | Clear the "Output Error-stopped" state, set the "Port Error" state, and signal a system error. |
| 12 | fatal_error | wait_for_error | Error shutdown procedure is complete. | Return to the wait_for_error state even though the output port is shut off. |

What is claimed is:

1. A digital data system comprising
a link that carries message packets,
a first node sending a plurality of message packets to a second node on the link as a sequence of message packets, with each message packet being sent from the first node with a sequence identifier, and each message packet comprising an initial portion comprising an error code,
the second node (i) inspecting the error code for each packet received on the link to detect an error condition, and (ii) returning a control symbol along with the sequence identifier of the received packet to the first node based on the result of that inspection,
the second node returning the control symbol to the first node before the entire message packet has arrived at the second node, and
the first node responding to the control symbol to control the further transmission of message packets to the second node over the link
wherein the second node returns a packet-not-accepted control symbol to the first node indicating receipt on the link of a message packet that is out of sequence
and wherein the first node responds to the packet-not-accepted control symbol by re-sending a portion of the sequence of message packets.

2. A digital data system according to claim 1, wherein the first node queries the second node for an identifier of a message packet in the sequence with which to begin resending.

3. A digital data system comprising:
first and second nodes connected by a first link,
the first node sending a plurality of message packets to the second node over the first link, each message packet including a header portion and a further portion, the header portion including an error code,
the second node checking the error code and sending a valid message packet to a further node over a further link,
at least a part of the header portion being a changeable part that may change as the message packet passes from the first link to the further link, and at least a part of the message packet being an invariant part that does not change,
whereby the error code need not to be recalculated when the message packet passes to the further link,
whereby corruption of the header portion of the packet is detected before the second node has received the entire packet, and without reference to the further portion of the packet,
and wherein the second node returning a control symbol to the first node before the entire message packet has arrived at the second node.

4. A digital data system according to claim 3, wherein the changeable part includes a sequence identifier, and the second node compares the changeable part of a message packet with an expected sequence identifier to detect an error.

5. A digital system comprising:
first and second nodes connected by a first link,
the first node sending a data from a buffer as a transmission sequence of one or more messages message packets to the second node over the first link, each message packet including a sequence identifier in an initial portion of the message packet,
the second node checking the initial portion to identify a faulty message reception,
and communicating said sequence identifier to the first node with a control symbol indicating whether reception was proper such that the first node may respond to the control symbol by clearing the buffer or retransmitting at least a portion of the transmission sequence,
whereby corruption of the initial portion is detected without reference to a subsequent portion of the packet,
and wherein the second node returning the control symbol to the first node before the entire message packet has arrived at the second node.

6. A digital data system comprising:
first and second nodes connected by a first link,
the first node sending a plurality of message packets to the second node over the first link with each message packet being sent from the first node with a sequence identifier, and each message packet comprising an initial portion comprising an error code,
the second node sending the message packets to a further node over a further link,
the second node (i) inspecting the error code for each message packet received on the link to detect and error condition, and (ii) returning a control symbol to the first node for each packet received therefrom the first link along with the sequence identifier of the received message packet based on the result of that inspection,
the second node returning the control symbol to the first node before the entire message packet has arrived at the second node,
the first node responding to the control symbol to control the further transmission of the message packets to the second node over the first link,
such that transmission of data packets from the first node to the further node proceeds efficiently.

* * * * *

UNITED STATES PATENT AND TRADEMARK OFFICE
CERTIFICATE OF CORRECTION

| | | |
|---|---|---|
| PATENT NO. | : 7,106,742 B1 | Page 1 of 1 |
| APPLICATION NO. | : 09/758798 | |
| DATED | : September 12, 2006 | |
| INVENTOR(S) | : Robert C. Frisch et al. | |

It is certified that error appears in the above-identified patent and that said Letters Patent is hereby corrected as shown below:

Col. 58, Claim 5, line 10, following "more", delete "messages".

Signed and Sealed this

Nineteenth Day of December, 2006

JON W. DUDAS
*Director of the United States Patent and Trademark Office*